United States Patent
Shin et al.

(10) Patent No.: US 9,171,490 B2
(45) Date of Patent: Oct. 27, 2015

(54) METHOD OF DRIVING DISPLAY PANEL AND DISPLAY APPARATUS FOR PERFORMING THE SAME

(71) Applicant: Samsung Display Co., Ltd., Gyeonggi-do (KR)

(72) Inventors: Kyoung-Ju Shin, Gyeonggi-do (KR); Joo-Young Kim, Gyeonggi-do (KR); Ji-Woong Jeong, Gyeonggi-do (KR); Tae-Ho Kim, Chungcheongnam-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 480 days.

(21) Appl. No.: 13/654,183

(22) Filed: Oct. 17, 2012

(65) Prior Publication Data

US 2013/0113787 A1    May 9, 2013

(30) Foreign Application Priority Data

Nov. 8, 2011  (KR) .......................... 10-2011-0115667

(51) Int. Cl.
*G09G 3/00* (2006.01)
*G06T 15/00* (2011.01)
*G09G 3/36* (2006.01)

(52) U.S. Cl.
CPC ............... *G09G 3/003* (2013.01); *G06T 15/00* (2013.01); *G09G 3/3659* (2013.01); *G09G 2300/0443* (2013.01); *G09G 2300/0852* (2013.01); *G09G 2300/0876* (2013.01)

(58) Field of Classification Search
CPC ......... G06T 15/00; G06T 17/00; G06T 19/00; G09G 3/36; G09G 3/003; G09G 3/3659
USPC ......... 345/690, 87, 211, 691, 419; 348/57, 58
See application file for complete search history.

(56) References Cited

U.S. PATENT DOCUMENTS

| | | | |
|---|---|---|---|
| 7,633,472 B2 * | 12/2009 | Edwards .......................... | 345/87 |
| 8,860,770 B2 * | 10/2014 | Jeong et al. .................... | 345/691 |
| 2004/0217956 A1 * | 11/2004 | Besl et al. ..................... | 345/419 |
| 2007/0171218 A1 * | 7/2007 | Hong et al. .................... | 345/211 |
| 2008/0218459 A1 | 9/2008 | Kim et al. | |
| 2010/0207954 A1 | 8/2010 | Kim | |
| 2010/0289884 A1 | 11/2010 | Kang | |
| 2010/0289974 A1 | 11/2010 | Kim et al. | |
| 2011/0128269 A1 * | 6/2011 | Lee et al. ....................... | 345/211 |
| 2011/0216177 A1 * | 9/2011 | Chae et al. ..................... | 348/57 |
| 2012/0140052 A1 * | 6/2012 | Baek et al. ..................... | 348/58 |
| 2013/0027439 A1 * | 1/2013 | Kim et al. ...................... | 345/690 |

* cited by examiner

*Primary Examiner* — Fred Tzeng
(74) *Attorney, Agent, or Firm* — F. Chau & Associates, LLC

(57) ABSTRACT

A method of driving a display panel includes determining a driving mode including a two-dimensional ("2D") mode and a three-dimensional ("3D") mode and charging a voltage which varies according to the driving mode to at least one subpixel in a unit pixel of the display panel.

49 Claims, 10 Drawing Sheets

| GRAY | GRAYH | GRAYL |
|---|---|---|
| 1 | GRAYH1 | GRAYL1 |
| 2 | GRAYH2 | GRAYL2 |
| 3 | GRAYH3 | GRAYL3 |
| ⋮ | ⋮ | ⋮ |

| GRAY | GRAYL |
|------|-------|
| 1 | GRAYL1 |
| 2 | GRAYL2 |
| 3 | GRAYL3 |
| ⋮ | ⋮ |

METHOD OF DRIVING DISPLAY PANEL AND DISPLAY APPARATUS FOR PERFORMING THE SAME

CROSS-REFERENCE TO RELATED APPLICATION

This application claims priority to Korean Patent Application No. 10-2011-0115667, filed on Nov. 8, 2011 under 35 U.S.C. §119, the contents of which are herein incorporated by reference in their entireties.

TECHNICAL FIELD

Exemplary embodiments of the present invention relate to a method of driving a display panel and a display apparatus for performing the method. More particularly, exemplary embodiments of the present invention relate to a method of driving a display panel that can improve display quality when the display panel displays a two-dimensional ("2D") image and a three-dimensional ("3D") image and a display apparatus for performing the method.

DISCUSSION OF THE RELATED ART

Demand for displaying 3D images in video game or movie industries has contributed to development of liquid crystal display apparatuses that can display the 3D images.

Generally, stereoscopic image display apparatuses display 3D images using binocular parallax between two eyes of a human. For example, as two eyes of a human are spaced apart from each other, images viewed by the two eyes at different angles are inputted to the human brain.

Stereoscopic image display apparatuses may include a stereoscopic type and an auto-stereoscopic type. For example, the stereoscopic type may include an anaglyph type and a shutter glasses type. For example, the auto-stereoscopic type may include a barrier type, a lenticular type and a liquid crystal lens type.

Display apparatuses capable of selectively displaying 2D images and 3D images display the images without refraction or blocking in a 2D mode so that a viewer may recognize the 2D images. The display apparatuses refract or selectively block the images on the display panel in a 3D mode so that the viewer may recognize the 3D images.

In the 2D mode, a super patterned vertical alignment ("SPVA") method independently driving high pixels and low pixels in unit pixels of the display panel may be used to improve a viewing angle.

When the SPVA method is applied to the 3D mode, the luminance of pixels may not be uniform due to the continuous shift of a viewpoint so that a moiré phenomenon may occur, and the luminance of images may decrease.

SUMMARY

Exemplary embodiments of the present invention provide a method of driving a display panel that can improve display quality when the display panel displays a two-dimensional ("2D") image and a three-dimensional ("3D") image and a display apparatus for performing the method of driving the display panel.

According to an exemplary embodiment, there is provided a method of driving a display panel. The method includes determining a driving mode including a two-dimensional ("2D") mode and a three-dimensional ("3D") mode and charging a voltage which varies according to the driving mode to at least one subpixel in a unit pixel of the display panel.

In an exemplary embodiment, the unit pixel includes a first subpixel and a second subpixel. A first voltage may be charged to the first subpixel and a second voltage is charged to the second subpixel in the 2D mode. The second voltage is different from the first voltage for at least one grayscale.

In an exemplary embodiment, a third voltage is charged to the first subpixel and a fourth voltage is charged to the second subpixel in the 3D mode. The fourth voltage is the same or substantially equal to the third voltage.

In an exemplary embodiment, the third and fourth voltages are the same or substantially equal to one of the first voltage and the second voltage.

In an exemplary embodiment, charging the voltage includes generating a gamma reference voltage which varies according to the driving mode.

In an exemplary embodiment, the unit pixel includes a first switching element connected to an N-th gate line and an M-th data line and a second switching element connected to an (N+1)-th gate line adjacent to the N-th gate line and the M-th data line. N and M are natural numbers.

In an exemplary embodiment, the unit pixel includes a first subpixel including the first switching element and a first pixel electrode connected to the first switching element and a second subpixel including the second switching element and a second pixel electrode connected to the second switching element. The second subpixel is adjacent to the first subpixel in an extending direction of the M-th data line.

In an exemplary embodiment, the unit pixel may include a first subpixel including the first switching element and a first pixel electrode connected to the first switching element and a second subpixel including the second switching element and a second pixel electrode connected to the second switching element. The second subpixel may be adjacent to the first subpixel in an extending direction of the N-th gate line.

In an exemplary embodiment, wherein the unit pixel may include a first switching element connected to an N-th gate line and an M-th data line and a second switching element connected to the N-th gate line and an (M+1)-th data line adjacent to the M-th data line.

In an exemplary embodiment, the unit pixel may include a first subpixel including the first switching element and a first pixel electrode connected to the first switching element and a second subpixel including the second switching element and a second pixel electrode connected to the second switching element. The second subpixel may be adjacent to the first subpixel in an extending direction of the M-th data line.

In an exemplary embodiment, the unit pixel may include a first subpixel including the first switching element and a first pixel electrode connected to the first switching element and a second subpixel including the second switching element and a second pixel electrode connected to the second switching element. The second subpixel may be adjacent to the first subpixel in an extending direction of the N-th gate line.

In an exemplary embodiment, the unit pixel may include a first subpixel, a second subpixel and a third switching element. The first subpixel may include a first switching element connected to an N-th gate line and an M-th data line, and a first pixel electrode connected to the first switching element. The second subpixel may include a second switching element connected to the N-th gate line and the M-th data line, and a second pixel electrode connected to the second switching element. The third switching element may include a gate electrode connected to an N-th control line, a source electrode connected to a second end of a capacitor, and a drain electrode connected to the second pixel electrode. A storage voltage may be applied to a first end of the capacitor.

In an exemplary embodiment, a voltage that varies according to the driving mode may be applied to the gate electrode of the third switching element.

In an exemplary embodiment, an N-th control signal may be applied to the gate electrode of the third switching element in the 2D mode. The N-th control signal having a gate on voltage after a gate on voltage of an N-th gate signal may be applied to the N-th gate line. A gate off voltage may be applied to the gate electrode of the third switching element in the 3D mode.

In an exemplary embodiment, the N-th control line may be connected to an (N+K)-th gate line in the 2D mode. The N-th control signal may be an (N+K)-th gate signal applied to the (N+K)-th gate line. K is a natural number.

In an exemplary embodiment, the unit pixel may include a first subpixel and a second subpixel. The first subpixel may include a first switching element connected to an N-th gate line, an M-th data line and a first pixel electrode, a first liquid crystal capacitor connected to the first pixel electrode and a common electrode and a first storage capacitor connected to the first pixel electrode and a first storage voltage line. The second subpixel may include a second switching element connected to the N-th gate line, the M-th data line and a second pixel electrode, a second liquid crystal capacitor connected to the second pixel electrode and the common electrode and a second storage capacitor connected to the second pixel electrode and a second storage voltage line.

In an exemplary embodiment, the charging the voltage may include generating storage voltages which vary according to the driving mode.

In an exemplary embodiment, a first storage voltage may be applied to the first storage voltage line and a second storage voltage may be applied to the second storage voltage line in the 2D mode. Each of the first storage voltage and the second storage voltage may periodically increase and decrease. The first storage voltage may have a phase different from a phase of the second storage voltage.

In an exemplary embodiment, a third storage voltage may be applied to the first storage voltage line and a fourth storage voltage may be applied to the second storage voltage line in the 3D mode. An amplitude of the third storage voltage may be smaller than an amplitude of the first storage voltage.

In an exemplary embodiment, a third storage voltage may be applied to the first storage voltage line and a fourth storage voltage may be applied to the second storage voltage line in the 3D mode. The third and fourth storage voltages may be direct-current ("DC") voltages.

In an exemplary embodiment of a display apparatus according to the present invention, the display apparatus includes a display panel and a panel driver. The display panel includes a unit pixel having a plurality of subpixels. The panel driver configured to charge a voltage which varies according to a driving mode to at least one subpixel of the subpixels. The driving mode includes a 2D mode and a 3D mode.

In an exemplary embodiment, the unit pixel may include a first subpixel and a second subpixel. The panel driver is configured to charge a first voltage to the first subpixel and a second voltage to the second subpixel in the 2D mode. The second voltage may be different from the first voltage for at least one grayscale.

In an exemplary embodiment, the panel driver is configured to charge a third voltage to the first subpixel and a fourth voltage to the second subpixel in the 3D mode. The fourth voltage may be the same or substantially equal to the third voltage.

In an exemplary embodiment, the third and fourth voltages may be the same or substantially equal to one of the first voltage and the second voltage.

In an exemplary embodiment, the panel driver may include a gamma reference voltage generator configured to generate a gamma reference voltage which varies according to the driving mode.

In an exemplary embodiment, the unit pixel may include a first switching element connected to an N-th gate line and an M-th data line and a second switching element connected to an (N+1)-th gate line adjacent to the N-th gate line and the M-th data line.

In an exemplary embodiment, the unit pixel may include a first subpixel including the first switching element and a first pixel electrode connected to the first switching element and a second subpixel including the second switching element and a second pixel electrode connected to the second switching element. The second subpixel may be adjacent to the first subpixel in an extending direction of the M-th data line.

In an exemplary embodiment, the unit pixel may include a first subpixel including the first switching element and a first pixel electrode connected to the first switching element and a second subpixel including the second switching element and a second pixel electrode connected to the second switching element. The second subpixel may be adjacent to the first subpixel in an extending direction of the N-th gate line.

In an exemplary embodiment, the display apparatus may further include a liquid crystal lens on the display panel. The liquid crystal lens is configured to transmit an image from the display panel without being refracted in the 2D mode and to refract the image from the display panel in the 3D mode. The liquid crystal lens is configured to provide an image on the first subpixel to a first viewpoint and an image on the second subpixel to a second viewpoint in the 3D mode.

In an exemplary embodiment, the display apparatus may further include a liquid crystal barrier on the display panel. The liquid crystal barrier is configured to transmit an image from the display panel without being blocked in the 2D mode and to selectively block the image from the display panel in the 3D mode. The liquid crystal barrier is configured to provide an image on the first subpixel to a first viewpoint and an image on the second subpixel to a second viewpoint in the 3D mode.

In an exemplary embodiment, the unit pixel may include a first switching element connected to an N-th gate line and an M-th data line and a second switching element connected to the N-th gate line and an (M+1)-th data line adjacent to the M-th data line.

In an exemplary embodiment, the unit pixel may include a first subpixel including the first switching element and a first pixel electrode connected to the first switching element and a second subpixel including the second switching element and a second pixel electrode connected to the second switching element. The second subpixel may be adjacent to the first subpixel in an extending direction of the M-th data line.

In an exemplary embodiment, the unit pixel may include a first subpixel including the first switching element and a first pixel electrode connected to the first switching element and a second subpixel including the second switching element and a second pixel electrode connected to the second switching element. The second subpixel may be adjacent to the first subpixel in an extending direction of the N-th gate line.

In an exemplary embodiment, the display apparatus may further include a liquid crystal lens on the display panel. The liquid crystal lens is configured to transmit an image from the display panel without being refracted in the 2D mode and to refract the image from the display panel in the 3D mode. The liquid crystal lens is configured to provide an image on the first subpixel to a first viewpoint and an image on the second subpixel to a second viewpoint in the 3D mode.

In an exemplary embodiment, the display apparatus may further include a liquid crystal barrier on the display panel. The liquid crystal barrier may transmit an image from the display panel without being blocked in the 2D mode and to selectively block the image from the display panel in the 3D mode. The liquid crystal barrier is configured to provide an image on the first subpixel to a first viewpoint and an image on the second subpixel to a second viewpoint in the 3D mode.

In an exemplary embodiment, the unit pixel may include a first subpixel, a second subpixel and a third switching element. The first subpixel may include a first switching element connected to an N-th gate line and an M-th data line, and a first pixel electrode connected to the first switching element. The second subpixel may include a second switching element connected to the N-th gate line and the M-th data line, and a second pixel electrode connected to the second switching element. The third switching element may include a gate electrode connected to an N-th control line, a source electrode connected to a second end of a capacitor, and a drain electrode connected to the second pixel electrode. A storage voltage may be applied to a first end of the capacitor.

In an exemplary embodiment, a voltage that varies according to the driving mode may be applied to the gate electrode of the third switching element.

In an exemplary embodiment, an N-th control signal may be applied to the gate electrode of the third switching element in the 2D mode. The N-th control signal having a gate on voltage after a gate on voltage of an N-th gate signal may be applied to the N-th gate line. A gate off voltage may be applied to the gate electrode of the third switching element in the 3D mode.

In an exemplary embodiment, the N-th control line may be connected to an (N+K)-th gate line in the 2D mode. The N-th control signal may be an (N+K)-th gate signal applied to the (N+K)-th gate line.

In an exemplary embodiment, the unit pixel may include a first subpixel and a second subpixel. The first subpixel may include a first switching element connected to an N-th gate line, an M-th data line and a first pixel electrode, a first liquid crystal capacitor connected to the first pixel electrode and a common electrode and a first storage capacitor connected to the first pixel electrode and a first storage voltage line. The second subpixel may include a second switching element connected to the N-th gate line, the M-th data line and a second pixel electrode, a second liquid crystal capacitor connected to the second pixel electrode and the common electrode and a second storage capacitor connected to the second pixel electrode and a second storage voltage line.

In an exemplary embodiment, panel driver may include a storage voltage generator is configured to generate storage voltages which vary according to the driving mode.

In an exemplary embodiment, the storage voltage generator is configured to apply a first storage voltage to the first storage voltage line and a second storage voltage to the second storage voltage line in the 2D mode. Each of the first storage voltage and the second storage voltage may periodically increase and decrease. The first storage voltage may have a phase different from a phase of the second storage voltage.

In an exemplary embodiment, the storage voltage generator is configured to apply a third storage voltage to the first storage voltage line and a fourth storage voltage to the second storage voltage line in the 3D mode. An amplitude of the third storage voltage may be smaller than an amplitude of the first storage voltage.

In an exemplary embodiment, the storage voltage generator is configured to apply a third storage voltage to the first storage voltage line and a fourth storage voltage to the second storage voltage line in the 3D mode. The third and fourth storage voltages may be a DC voltages.

In an exemplary embodiment, the display apparatus may further include a liquid crystal lens on the display panel. The liquid crystal lens is configured to transmit an image from the display panel without being refracted in the 2D mode and to refract the image from the display panel in the 3D mode.

In an exemplary embodiment, the display apparatus may further include a liquid crystal barrier on the display panel. The liquid crystal barrier is configured to transmit an image from the display panel without being blocked in the 2D mode and to selectively block the image from the display panel in the 3D mode.

In an exemplary embodiment, the panel driver is configured to temporally divide image data and to apply the divided image data to the display panel in the 3D mode.

In an exemplary embodiment, the unit pixel may include a first unit pixel and a second unit pixel. The first unit pixel may correspond to a viewpoint different from a viewpoint of the second unit pixel. The display apparatus may further include a polarizing element disposed on the display panel. The polarizing element is configured to polarize a light transmitted through the first unit pixel and a light transmitted through the second unit pixel in different directions from each other in the 3D mode.

In an exemplary embodiment of a display panel according to the present invention, the display panel includes a pixel that includes first and second subpixels. The first and second subpixels are configured to be charged with different voltages, respectively, in a two dimensional driving mode and wherein both of the first and second subpixels are configured to be charged with one of the different voltages in a three dimensional driving mode.

According to the method of driving the display panel and the display apparatus for performing the method, a side visibility may be improved when the display panel displays the 2D image and a moiré may be prevented and a luminance of an image may be improved when the display panel displays the 3D image.

Thus, a display quality may be improved when the display panel displays the 2D image and the 3D image.

BRIEF DESCRIPTION OF THE DRAWINGS

The embodiments of the present invention will become more apparent in the detailed description with reference to the accompanying drawings, in which.

DETAILED DESCRIPTION

Figure 1:
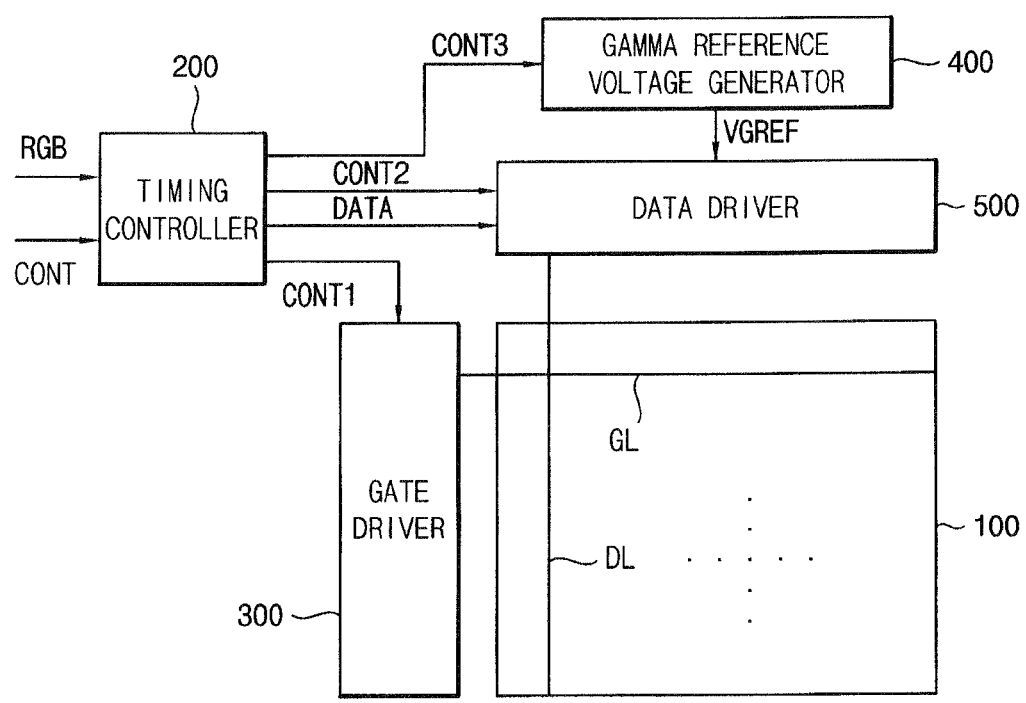
FIG. 1 is a block diagram illustrating a display apparatus according to an exemplary embodiment of the present invention.
Figure 1:
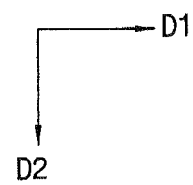

Hereinafter, exemplary embodiments of the present invention will be described in further detail with reference to the accompanying drawings, wherein the same reference numerals may be used to denote the same or substantially the same elements throughout the specification and the drawings. The present invention may be embodied in various different ways and should not be construed as limited to the exemplary embodiments described herein.

It will be understood that when an element or layer is referred to as being "on," "connected to" or "coupled to" another element or layer, it can be directly on, connected or coupled to the other element or layer or intervening elements or layers may be present.

As used herein, the singular forms, "a," "an" and "the" are intended to include the plural forms as well, unless the context clearly indicates otherwise.

FIG. 1 is a block diagram illustrating a display apparatus according to an exemplary embodiment of the present invention.

Referring to FIG. 1, the display apparatus includes a display panel 100 and a panel driver. The panel driver includes a timing controller 200, a gate driver 300, a gamma reference voltage generator 400 and a data driver 500.

The display panel 100 includes a plurality of gate lines GL, a plurality of data lines DL and a plurality of unit pixels connected to the gate lines GL and the data lines DL. The gate lines GL extend in a first direction D1 and the data lines DL extend in a second direction D2 crossing the first direction D1.

Each unit pixel includes a switching element (not shown), a liquid crystal capacitor (not shown) and a storage capacitor (not shown). The liquid crystal capacitor and the storage capacitor are electrically connected to the switching element. The unit pixels are disposed in a matrix form.

Each unit pixel includes a first subpixel and a second subpixel. A structure of the unit pixel is described in detail referring to FIG. 2.

The timing controller 200 receives input image data RGB and an input control signal CONT from an external apparatus (not shown). The input image data include red image data R, green image data G and blue image data B. The input control signal CONT includes a driving mode signal representing a driving mode including a 2D mode and a 3D mode. According to an embodiment, the input control signal CONT further includes a master clock signal, a data enable signal. According to an embodiment, the input control signal CONT further includes a vertical synchronizing signal and a horizontal synchronizing signal.

The timing controller 200 generates a first control signal CONT1, a second control signal CONT2, a third control signal CONT3 and a data signal DATA based on the input image data RGB and the input control signal CONT.

The timing controller 200 generates the first control signal CONT1 for controlling an operation of the gate driver 300 based on the input control signal CONT and outputs the first control signal CONT1 to the gate driver 300. The first control signal CONT1 includes the driving mode signal. According to an embodiment, the first control signal CONT1 further includes a vertical start signal and a gate clock signal.

The timing controller 200 generates the second control signal CONT2 for controlling an operation of the data driver 500 based on the input control signal CONT and outputs the second control signal CONT2 to the data driver 500. The second control signal CONT2 includes the driving mode signal. According to an embodiment, the second control signal CONT2 further includes a horizontal start signal and a load signal.

The timing controller 200 performs rendering for the input image data RGB and generates the data signal DATA based on the driving mode signal. The timing controller 200 outputs the data signal DATA to the data driver 500.

The data signal DATA includes a left data signal and a right data signal in the 3D mode. According to an embodiment, the data signal DATA further includes a black data signal inserted between the left data signal and the right data signal in the 3D mode.

The timing controller 200 generates the third control signal CONT3 for controlling an operation of the gamma reference voltage generator 400 based on the input control signal CONT and outputs the third control signal CONT3 to the gamma reference voltage generator 400. The third control signal CONT3 includes the driving mode signal.

The gate driver 300 generates gate signals driving the gate lines GL in response to the first control signal CONT1 received from the timing controller 200. The gate driver 300 sequentially outputs the gate signals to the gate lines GL.

The gate driver 300 is directly mounted on the display panel 100 or connected to the display panel 100 in a tape carrier package (TCP) type. Alternatively, the gate driver 300 is integrated on the display panel 100.

The gamma reference voltage generator 400 generates a gamma reference voltage VGREF in response to the third control signal CONT3 received from the timing controller 200. The gamma reference voltage generator 400 provides the gamma reference voltage VGREF to the data driver 500. The gamma reference voltage VGREF has a value corresponding to a level of the data signal DATA.

According to an embodiment, the gamma reference voltage generator 400 generates gamma reference voltages VGREF which are different from each other with respect to the same grayscale data according to the driving mode.

According to an embodiment, the gamma reference voltage generator 400 is disposed in the timing controller 200 or in the data driver 500.

The data driver 500 receives the second control signal CONT2 and the data signal DATA from the timing controller 200, and receives the gamma reference voltages VGREF from the gamma reference voltage generator 400. The data driver 500 converts the data signal DATA into analog data voltages using the gamma reference voltages VGREF. The data driver 500 sequentially outputs the data voltages to the data lines DL.

The data driver 500 includes a shift register (not shown), a latch (not shown), a signal processing part (not shown) and a buffer part (not shown). The shift register outputs a latch pulse to the latch. The latch temporally stores the data signal DATA. The latch outputs the data signal DATA to the signal processing part. The signal processing part generates an analog data voltage based on the digital data signal and the gamma reference voltage VGREF. The signal processing part outputs the data voltage to the buffer part. The buffer part compensates for the data voltage to have a uniform level. The buffer part outputs the compensated data voltage to the data line DL.

According to an embodiment, the data driver 500 is directly mounted on the display panel 100 or connected to the display panel 100 in a TCP type. Alternatively, the data driver 500 is integrated on the display panel 100.

The display apparatus further includes a liquid crystal lens (not shown) on the display panel 100. The liquid crystal lens transmits images from the display panel 100 without refraction in the 2D mode. The liquid crystal lens refracts images from the display panel 100 and provides a first viewpoint image to a first viewpoint and a second viewpoint image to a second viewpoint in the 3D mode. For example, according to an embodiment, the first viewpoint image includes a left image. A viewer's left eye corresponds to the first viewpoint. The second viewpoint image includes a right image. The viewer's right eye corresponds to the second viewpoint.

Alternatively, the display apparatus further includes a liquid crystal barrier (not shown) on the display panel 100. The liquid crystal barrier transmits images from the display panel 100 without blocking in the 2D mode. The liquid crystal barrier selectively blocks images from the display panel 100 and provides the first viewpoint image to the first viewpoint and the second viewpoint image to the second viewpoint in the 3D mode.

Alternatively, the display apparatus temporally divides images of the display panel 100 into left images and right images. The viewer wears shutter glasses selectively transmitting the left images to his/her left eye and the right images to his/her right eye.

Alternatively, the display apparatus further includes a polarizing element (not shown) that polarizes images and generates the left images and the right images in the 3D mode. The polarizing element is disposed on the display panel 100. The polarizing element causes light transmitted through a first unit pixel and light transmitted through a second unit pixel to have different directions from each other. For example, according to an embodiment, a left image is left-circularly polarized and the right image is right-circularly polarized. As a consequence, the viewer receives 3D images using polarizing glasses selectively transmitting the left-circularly polarized image and the right-circularly polarized image.

Figures 2, 3:
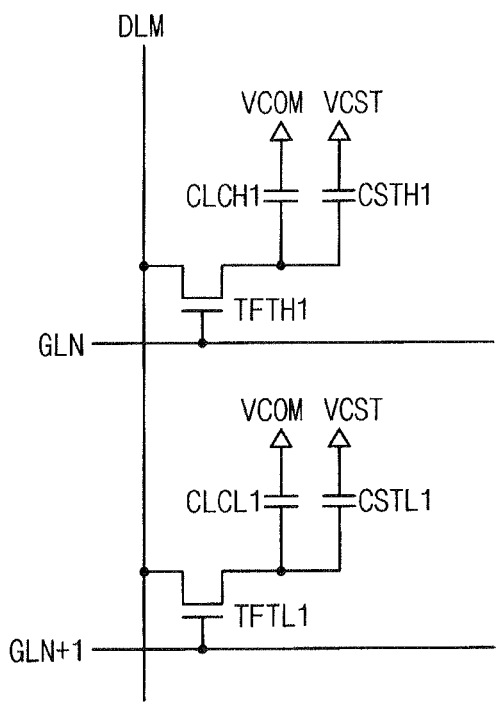
FIG. 2 is a circuit diagram illustrating a unit pixel included in the display apparatus of FIG. 1.
FIG. 3 is a conceptual diagram illustrating a lookup table referred to by a timing controller of FIG. 1.

FIG. 2 is a circuit diagram illustrating a unit pixel included in the display apparatus of FIG. 1.

Referring to FIG. 2, the unit pixel includes a first subpixel and a second subpixel. The first subpixel includes a high pixel. The second subpixel includes a low pixel.

In the 2D mode, a first voltage is charged to the first subpixel and a second voltage is charged to the second subpixel. The second voltage is different from the first voltage for at least one grayscale. For example, according to an embodiment, the first voltage is greater than the second voltage.

In the 3D mode, a third voltage is charged to the first subpixel and a fourth voltage is charged to the second subpixel. The fourth voltage is the same or substantially equal to the third voltage. For example, according to an embodiment, the third and fourth voltages are the same or substantially equal to one of the first and second voltages.

The first subpixel includes a first switching element TFTH1, a first liquid crystal capacitor CLCH1 and a first storage capacitor CSTH1. The second subpixel includes a second switching element TFTL1, a second liquid crystal capacitor CLCL1 and a second storage capacitor CSTL1. The second subpixel is adjacent to the first subpixel in an extending direction of the data line DL.

The first switching element TFTH1 is connected to an N-th gate line GLN and an M-th data line DLM. A gate electrode of the first switching element TFTH1 is connected to the N-th gate line GLN. A source electrode of the first switching element TFTH1 is connected to the M-th data line DLM. A drain electrode of the first switching element TFTH1 is connected to a first end of the first liquid crystal capacitor CLCH1 and a first end of the first storage capacitor CSTH1. A first pixel electrode is disposed at the first end of the first liquid crystal capacitor CLCH1. A common voltage VCOM is applied to a second end of the first liquid crystal capacitor CLCH1 opposite to the first end of the first liquid crystal capacitor CLCH1 through a common electrode. A storage voltage VCST is applied to a second end of the first storage capacitor CSTH1 opposite to the first end of the first storage capacitor CSTH1. For example, according to an embodiment, the common voltage VCOM is the same or substantially equal to the storage voltage VCST.

The second switching element TFTL1 is connected to an (N+1)-th gate line GLN+1 adjacent to the N-th gate line GLN and the M-th data line DLM. A gate electrode of the second switching element TFTL1 is connected to the (N+1)-th gate line GLN+1. A source electrode of the second switching element TFTL1 is connected to the M-th data line DLM. A drain electrode of the second switching element TFTL1 is connected to a first end of the second liquid crystal capacitor CLCL1 and a first end of the second storage capacitor CSTL1. A second pixel electrode is disposed at the first end of the second liquid crystal capacitor CLCL1. A common voltage VCOM is applied to a second end of the second liquid crystal capacitor CLCL1 opposite to the first end of the second liquid crystal capacitor CLCL1 through the common electrode. A storage voltage VCST is applied to a second end of the second storage capacitor CSTL1 opposite to the first end of the second storage capacitor CSTL1. In an exemplary embodiment, at least one of the first and second storage capacitors CSTH1 and CSTL1 may be omitted.

FIG. 3 is a conceptual diagram illustrating a lookup table referred to by the timing controller 200 of FIG. 1.

The timing controller 200 includes a driving mode determining part (not shown), a control signal generating part (not shown), a data compensating part (not shown) and a grayscale data converting part (not shown). The timing controller 200 may be logically divided into the driving mode determining part, the control signal generating part, the data compensating part and the grayscale data converting part.

The driving mode determining part determines whether the driving mode is the 2D mode or the 3D mode. The driving mode determining part determines the driving mode based on a driving mode signal inputted from an outside source. Alternatively, the driving mode determining part determines the driving mode based on the input image data RGB.

The control signal generating part generates the first control signal CONT1 based on the input control signal CONT and outputs the first control signal CONT1 to the gate driver 300. The control signal generating part generates the second control signal CONT2 based on the input control signal CONT and outputs the second control signal CONT2 to the data driver 500. The control signal generating part generates the third control signal CONT3 based on the input control signal CONT and outputs the third control signal CONT3 to the gamma reference voltage generator 400.

The data compensating part receives input image data RGB from an outside source. The data compensating part compensates for the input image data RGB and generates the data signal DATA.

The data compensating part includes an adaptive color correction part (not shown) and a dynamic capacitance compensating part (not shown).

The adaptive color correction part receives the input image data RGB and performs an adaptive color correction ("ACC") process. The adaptive color correction part compensates for the input image data RGB using a gamma curve.

The dynamic capacitance compensating part performs a dynamic capacitance compensation ("DCC") process that compensates for grayscales of present frame data using previous frame data and the present frame data.

The grayscale data converting part converts a grayscale of the input image data based on the driving mode. The grayscale data converting part outputs the converted grayscale data to the data driver 500. The grayscale of the input image data includes grayscale data of the data signal DATA. The grayscale data converting part refers to the lookup table of FIG. 3.

The lookup table of FIG. 3 has columns respectively representing the grayscales GRAY of the input image data, first grayscale data GRAYH and second grayscale data GRAYL.

In the 2D mode, the grayscale data converting part converts the grayscales GRAY of the input image data into the first grayscale data GRAYH corresponding to the first subpixel and the second grayscale data GRAYL corresponding to the second subpixel.

For example, according to an embodiment, when the driving mode is the 2D mode and the grayscale GRAY of the input image data is 1, the grayscale data converting part sets the first grayscale data GRAYH as GRAYH1 corresponding to the first subpixel and the second grayscale data GRAYL as GRAYL1 corresponding to the second subpixel.

In an exemplary embodiment, when the grayscale data converting part converts all of the grayscales GRAY of the input image data into the first grayscale data GRAYH and the second grayscale data GRAYL, the first grayscale data GRAYH have the same or substantially the same values as the second grayscale data GRAYL for some of the grayscales. For example, according to an embodiment, when the grayscale data converting part converts 256 grayscales of the input image data into the first grayscale data GRAYH and the second grayscale data GRAYL, some of the 256 values of the first grayscale data GRAYH are the same or substantially the same as some of the 256 values of the second grayscale data GRAYH with respect to the same grayscales of the input image data.

The grayscale data converting part outputs the converted first and second grayscale data GRAYH and GRAYL to the data driver 500. In the 2D mode, the data driver 500 provides a data voltage corresponding to the first grayscale data GRAYH to the first subpixel and a data voltage corresponding to the second grayscale data GRAYL to the second subpixel using the gamma reference voltage generator 400. As a result, the data voltage charged to the first subpixel is different from the data voltage charged to the second subpixel for at least one grayscale.

In the 3D mode, the grayscale data converting part does not convert the grayscales GRAY of the input image data.

As a consequence, when the driving mode is the 3D mode and the grayscale GRAY of the input image data is 1, the first grayscale data corresponding to the first subpixel is 1 and the second grayscale data corresponding to the second subpixel is 1.

The grayscale data converting part outputs the grayscale GRAY of the input image data to the gate driver 500. In the 3D mode, the data driver 500 provides a data voltage corresponding to the grayscale GRAY of the input image data to the first subpixel and a data voltage corresponding to the grayscale GRAY of the input image data to the second subpixel using the gamma reference voltage generator 400. As a result, the data voltage charged to the first subpixel is the same or substantially the same as the data voltage charged to the second subpixel.

According to an embodiment, the timing controller 200 further includes a memory (not shown). The lookup table is stored in the memory. According to an embodiment, the memory is disposed in the timing controller 200. Alternatively, the memory is disposed out of the timing controller 200.

According to an exemplary embodiment, a data voltage charged to the first subpixel is different from a data voltage charged to the second subpixel in the 2D mode so that side visibility may be improved. The data voltage charged to the first subpixel is the same or substantially the same as the data voltage charged to the second subpixel in the 3D mode so that moiré may be prevented and the luminance of images may be improved. As a consequence, display quality may be improved when the display panel displays 2D images and 3D images.

Figures 4, 5:
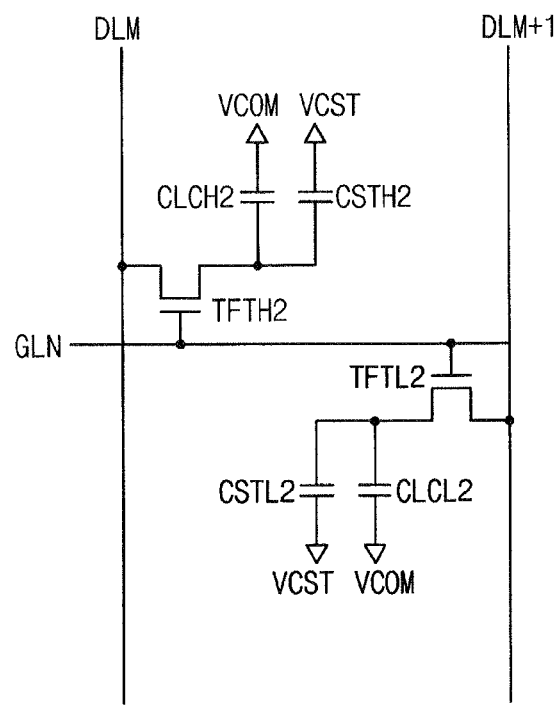
FIG. 4 is a conceptual diagram illustrating a lookup table referred to by a timing controller of a display apparatus according to an exemplary embodiment of the present invention.
FIG. 5 is a circuit diagram illustrating a unit pixel of a display apparatus according to an exemplary embodiment of the present invention.

FIG. 4 is a conceptual diagram illustrating a lookup table referred to by a timing controller of a display apparatus according to an exemplary embodiment of the present invention.

The display apparatus is the same or substantially the same as the display apparatus described in connection with FIGS. 1 to 3 except for the lookup table referred to by the timing controller.

Referring to FIG. 4, the lookup table of FIG. 4 has columns respectively representing grayscales GRAY of the input image data and second grayscale data GRAYL.

In the 2D mode, the grayscale data converting part converts the grayscale GRAY of the input image data into the second grayscale data GRAYL corresponding to the second subpixel.

For example, according to an embodiment, when the driving mode is the 2D mode and the grayscale GRAY of the input image data is 1, the grayscale data converting part sets the second grayscale data GRAYL as GRAYL1 corresponding to the second subpixel.

The grayscale data converting part outputs the grayscale GRAY of the input image data and converted second grayscale data GRAYL to the data driver 500. In the 2D mode, the data driver 500 provides a data voltage corresponding to the grayscale GRAY of the input image data to the first subpixel and a data voltage corresponding to the second grayscale data GRAYL to the second subpixel using the gamma reference voltage generator 400. As a result, the data voltage charged to the first subpixel is different from the data voltage charged to the second subpixel for at least one grayscale.

In the 3D mode, the grayscale data converting part does not convert the grayscale GRAY of the input image data.

As a consequence, when the driving mode is the 3D mode and the grayscale GRAY of the input image data is 1, the first grayscale data corresponding to the first subpixel is 1 and the second grayscale data corresponding to the second subpixel is 1.

The grayscale data converting part outputs the grayscale GRAY of the input image data to the gate driver 500. In the 3D mode, the data driver 500 provides a data voltage corresponding to the grayscale GRAY of the input image data to the first subpixel and a data voltage corresponding to the grayscale GRAY of the input image data to the second subpixel using the gamma reference voltage generator 400. As a result, the data voltage charged to the first subpixel is the same or substantially the same as the data voltage charged to the second subpixel.

According to an exemplary embodiment, a data voltage charged to the first subpixel is different from a data voltage charged to the second subpixel in the 2D mode so that side visibility may be improved. The data voltage charged to the first subpixel is the same or substantially the same as the data voltage charged to the second subpixel in the 3D mode so that moiré may be prevented and the luminance of images may be improved. As a consequence, display quality may be improved when the display panel displays 2D images and 3D images.

The grayscale of the input image data is used as grayscale data for the first subpixel so that the capacity of the lookup table may be decreased.

FIG. 5 is a circuit diagram illustrating a unit pixel of a display apparatus according to an exemplary embodiment of the present invention.

The display apparatus is the same or substantially the same as the display apparatus described in connection with FIGS. 1 to 3 except for the structure of the unit pixel.

Referring to FIG. 5, the unit pixel includes a first subpixel and a second subpixel. The first subpixel is a high pixel. The second subpixel is a low pixel.

In the 2D mode, a first voltage is charged to the first subpixel and a second voltage is charged to the second subpixel. The second voltage is different from the first voltage for at least one grayscale. For example, according to an embodiment, the first voltage is greater than the second voltage.

In the 3D mode, a third voltage is charged to the first subpixel and a fourth voltage is charged to the second subpixel. The fourth voltage is the same or substantially equal to the third voltage. For example, according to an embodiment, the third and fourth voltages are the same or substantially equal to one of the first and second voltages.

The first subpixel includes a first switching element TFTH2, a first liquid crystal capacitor CLCH2 and a first storage capacitor CSTH2. The second subpixel includes a second switching element TFTL2, a second liquid crystal capacitor CLCL2 and a second storage capacitor CSTL2. The second subpixel is adjacent to the first subpixel in an extending direction of the data line DL.

The first switching element TFTH2 is connected to an N-th gate line GLN and an M-th data line DLM. A gate electrode of the first switching element TFTH2 is connected to the N-th gate line GLN. A source electrode of the first switching element TFTH2 is connected to the M-th data line DLM. A drain electrode of the first switching element TFTH2 is connected to a first end of the first liquid crystal capacitor CLCH2 and a first end of the first storage capacitor CSTH2. A first pixel electrode is disposed at the first end of the first liquid crystal capacitor CLCH2. A common voltage VCOM is applied to a second end of the first liquid crystal capacitor CLCH2 opposite to the first end of the first liquid crystal capacitor CLCH2 through the common electrode. A storage voltage VCST is applied to a second end of the first storage capacitor CSTH2 opposite to the first end of the first storage capacitor CSTH2. For example, according to an embodiment, the common voltage VCOM is the same or substantially equal to the storage voltage VCST.

The second switching element TFTL2 is connected to the N-th gate line GLN and an (M+1)-th data line DLM+1 adjacent to the M-th data line DLM. A gate electrode of the second switching element TFTL2 is connected to the N-th gate line GLN. A source electrode of the second switching element TFTL2 is connected to the (M+1)-th data line DLM+1. A drain electrode of the second switching element TFTL2 is connected to a first end of the second liquid crystal capacitor CLCL2 and a first end of the second storage capacitor CSTL2. A second pixel electrode is disposed at the first end of the second liquid crystal capacitor CLCL2. A common voltage VCOM is applied to a second end of the second liquid crystal capacitor CLCL2 opposite to the first end of the second liquid crystal capacitor CLCL2 through the common electrode. A storage voltage VCST is applied to a second end of the second storage capacitor CSTL2 opposite to the first end of the second storage capacitor CSTL2. In an exemplary embodiment, at least one of the first and second storage capacitors CSTH2 and CSTL2 is omitted.

The lookup tables of FIGS. 3 and 4 are employed in the display apparatus described in connection with FIG. 5.

According to an exemplary embodiment, a data voltage charged to the first subpixel is different from a data voltage charged to the second subpixel in the 2D mode so that side visibility may be improved. The data voltage charged to the first subpixel is the same or substantially the same as the data voltage charged to the second subpixel in the 3D mode so that moiré may be prevented and the luminance of image may be improved. As a consequence, display quality may be improved when the display panel displays 2D images and 3D images.

Figure 6:
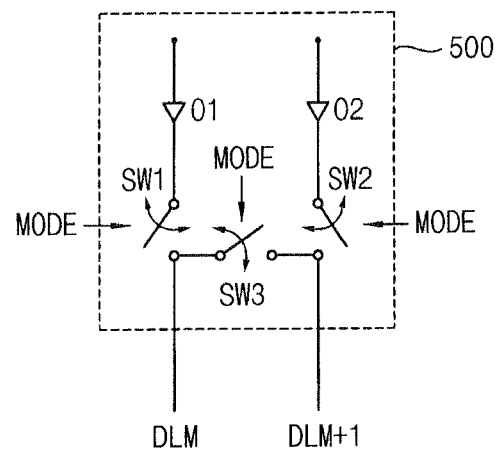
FIG. 6 is a conceptual diagram illustrating a connecting structure between an output part of a data driver and a unit pixel of a display apparatus according to an exemplary embodiment of the present invention.

FIG. 6 is a conceptual diagram illustrating a connecting structure between an output part of a data driver and a unit pixel of a display apparatus according to an exemplary embodiment of the present invention.

The display apparatus is the same or substantially the same as the display apparatus described in connection with FIG. 5 except that the data driver 500 outputs the same data voltage regardless of the driving mode and the output part of the data driver 500 includes a switching part.

The data driver 500 of the display apparatus outputs a first voltage to the first subpixel and a second voltage to the second subpixel regardless of the driving mode. The second voltage is different from the first voltage for at least one grayscale. The unit pixel of FIG. 5 is applied to the display apparatus described in connection with FIG. 6.

Referring to FIGS. 5 and 6, a first switch SW1 is disposed between a first output buffer O1 of the data driver 500 and the M-th data line DLM. A second switch SW2 is disposed between a second output buffer O2 of the data driver 500 and the (M+1)-th data line DLM+1. A third switch SW3 is disposed between the M-th data line DLM and the (M+1)-th data line DLM+1.

In the 2D mode, the first and second switches SW1 and SW2 are turned on and the third switch SW3 is turned off. Thus, the first voltage is charged to the first subpixel connected to the M-th data line DLM. The second voltage is charged to the second subpixel connected to the (M+1)-th data line DLM+1.

In the 3D mode, the first and third switches SW1 and SW3 are turned on and the second switch SW2 is turned off. Thus, the first voltage is charged to the first subpixel connected to the M-th data line DLM and the second subpixel connected to the (M+1)-th data line DLM+1.

According to an exemplary embodiment, a data voltage charged to the first subpixel is different from a data voltage charged to the second subpixel in the 2D mode so that side visibility may be improved. The data voltage charged to the first subpixel is the same or substantially the same as the data voltage charged to the second subpixel in the 3D mode so that moiré may be prevented and the luminance of images may be improved. As a consequence, display quality may be improved when the display panel displays 2D images and 3D images.

Figure 7:
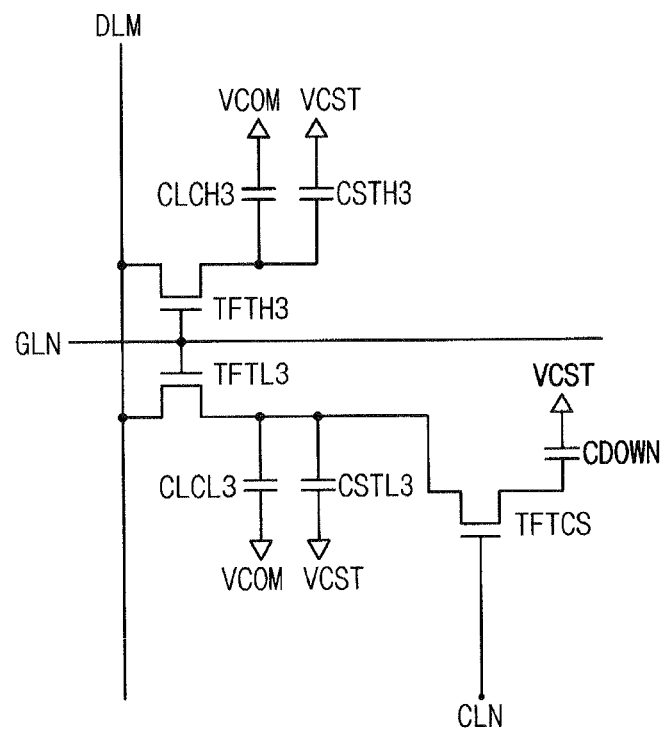
FIG. 7 is a circuit diagram illustrating a unit pixel of a display apparatus according to an exemplary embodiment of the present invention.

FIG. 7 is a circuit diagram illustrating a unit pixel of a display apparatus according to an exemplary embodiment of the present invention;

The display apparatus is the same or substantially the same as the display apparatus described in connection with FIGS. 1 to 3 except for the structure of the unit pixel.

Referring to FIG. 7, the unit pixel includes a first subpixel and a second subpixel. The first subpixel is a high pixel. The second subpixel is a low pixel.

The first subpixel includes a first switching element TFTH3, a first liquid crystal capacitor CLCH3 and a first storage capacitor CSTH3. The second subpixel includes a second switching element TFTL3, a second liquid crystal capacitor CLCL3, a second storage capacitor CSTL3, a third switching element TFTCS and a down capacitor CDOWN.

The first switching element TFTH3 is connected to an N-th gate line GLN, an M-th data line DLM and a first pixel electrode. A gate electrode of the first switching element TFTH3 is connected to the N-th gate line GLN. A source electrode of the first switching element TFTH3 is connected to the M-th data line DLM. A drain electrode of the first switching element TFTH3 is connected to a first end of the first liquid crystal capacitor CLCH3 and a first end of the first storage capacitor CSTH3. The first pixel electrode is disposed at the first end of the first liquid crystal capacitor CLCH3. A common voltage VCOM is applied to a second end of the first liquid crystal capacitor CLCH3 opposite to the first end of the first liquid crystal capacitor CLCH3 through the common electrode. A storage voltage VCST is applied to a second end of the first storage capacitor CSTH3 opposite to the first end of the first storage capacitor CSTH3. For example, according to an embodiment, the common voltage VCOM is the same or substantially equal to the storage voltage VCST.

The second switching element TFTL3 is connected to the N-th gate line GLN and the M-th data line DLM and a second pixel electrode. A gate electrode of the second switching element TFTL3 is connected to the N-th gate line GLN. A source electrode of the second switching element TFTL3 is connected to the M-th data line DLM. A drain electrode of the second switching element TFTL3 is connected to a first end of the second liquid crystal capacitor CLCL3 and a first end of the second storage capacitor CSTL3. The second pixel electrode is disposed at the first end of the second liquid crystal capacitor CLCL3. A common voltage VCOM is applied to a second end of the second liquid crystal capacitor CLCL3 opposite to the first end of the second liquid crystal capacitor CLCL3 through the common electrode. A storage voltage VCST is applied to a second end of the second storage capacitor CSTL3 opposite to the first end of the second storage capacitor CSTL3.

A gate electrode of the third transistor TFTCS is connected to an N-th control line CLN. A source electrode of the third transistor TFTCS is connected to a second end of the down capacitor CDOWN. The storage voltage VCST is applied to a first end of the down capacitor CDOWN opposite to the second end of the down capacitor CDOWN. A drain electrode of the third transistor TFTCS is connected to the first end of the second liquid crystal capacitor CLCL3 and the first end of the second storage capacitor CSTL3. In an exemplary embodiment, at least one of the first and second storage capacitors CSTH3 and CSTL3 is omitted.

Figure 8:
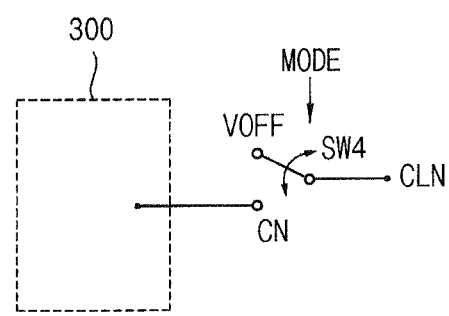
FIG. 8 is a conceptual diagram illustrating a connecting structure between an output part of a gate driver and a unit pixel of FIG. 7.

FIG. 8 is a conceptual diagram illustrating a connecting structure between an output part of a gate driver and the unit pixel of FIG. 7.

Referring to FIG. 8, the N-th control line CLN is connected to a fourth switch SW4 which is operated according to a driving mode signal MODE. An N-th control signal CN controlling the N-th control line CLN and a gate off voltage VOFF turning off the switching element are selectively applied to the N-th control line CLN according to the driving mode signal MODE. The N-th control signal CN includes a gate on voltage and a gate off voltage. The N-th control signal CN has a gate on voltage, which is at a high level, after a gate on voltage of a gate signal is applied to the N-th gate line GLN. According to an embodiment, the N-th control signal CN has the same phase as an (N+K)-th gate signal. The N-th control line CLN is connected to an (N+K)-th gate line through the fourth switch SW4. For example, according to an embodiment, the (N+K)-th gate line is the (N+1)-th gate line GLN+1.

In the 2D mode, the N-th control signal CN is applied to the N-th control line CLN.

When a gate on voltage of the N-th gate signal GN is applied to the N-th gate line GLN, the first and second switching elements TFTH3 and TFTL3 are turned on so that a first voltage is applied to the first subpixel and the second subpixel.

After the gate on voltage of the N-th gate signal GN is applied to the N-th gate line GLN, the gate on voltage of the N-th control signal CN is applied to the N-th control signal CLN so that the third switching element TFTCS is turned on. When the third switching element TFTCS is turned on, a level of the first voltage applied to the second subpixel is decreased due to the down capacitor CDOWN and the storage voltage VCST. As a result, a data voltage charged to the first subpixel is different from a data voltage charged to the second subpixel for at least one grayscale. As shown in FIG. 8, the N-th control signal CN is applied to the N-th control line CLN through the fourth switch SW4. In an exemplary embodiment, the N-th control line CNL is connected to the (N+K)-th gate line through the fourth switch SW4 to apply the (N+K)-th gate signal to the gate electrode of the third switching element TFTCS. For example, according to an embodiment, N+K is N+1.

In the 3D mode, the gate off voltage of the N-th control signal CN is applied to the N-th control line CLN.

When a gate on voltage of the N-th gate signal GN is applied to the N-th gate line GLN, the first and second switching elements TFTH3 and TFTL3 are turned on so that a first voltage is applied to the first subpixel and the second subpixel.

After the gate on voltage of the N-th gate signal GN is applied to the N-th gate line GLN, the gate off voltage VOFF of the N-th control signal CN is applied to the N-th control signal CLN so that the third switching element TFTCS is turned off. As a result, the first voltage is charged to the first subpixel and the second subpixel.

According to an exemplary embodiment, a data voltage charged to the first subpixel is different from a data voltage charged to the second subpixel in the 2D mode so that side visibility may be improved. The data voltage charged to the first subpixel is the same or substantially the same as the data voltage charged to the second subpixel in the 3D mode so that moiré may be prevented and the luminance of images may be improved. As a consequence, display quality may be improved when the display panel displays 2D images and 3D images.

Figure 9:
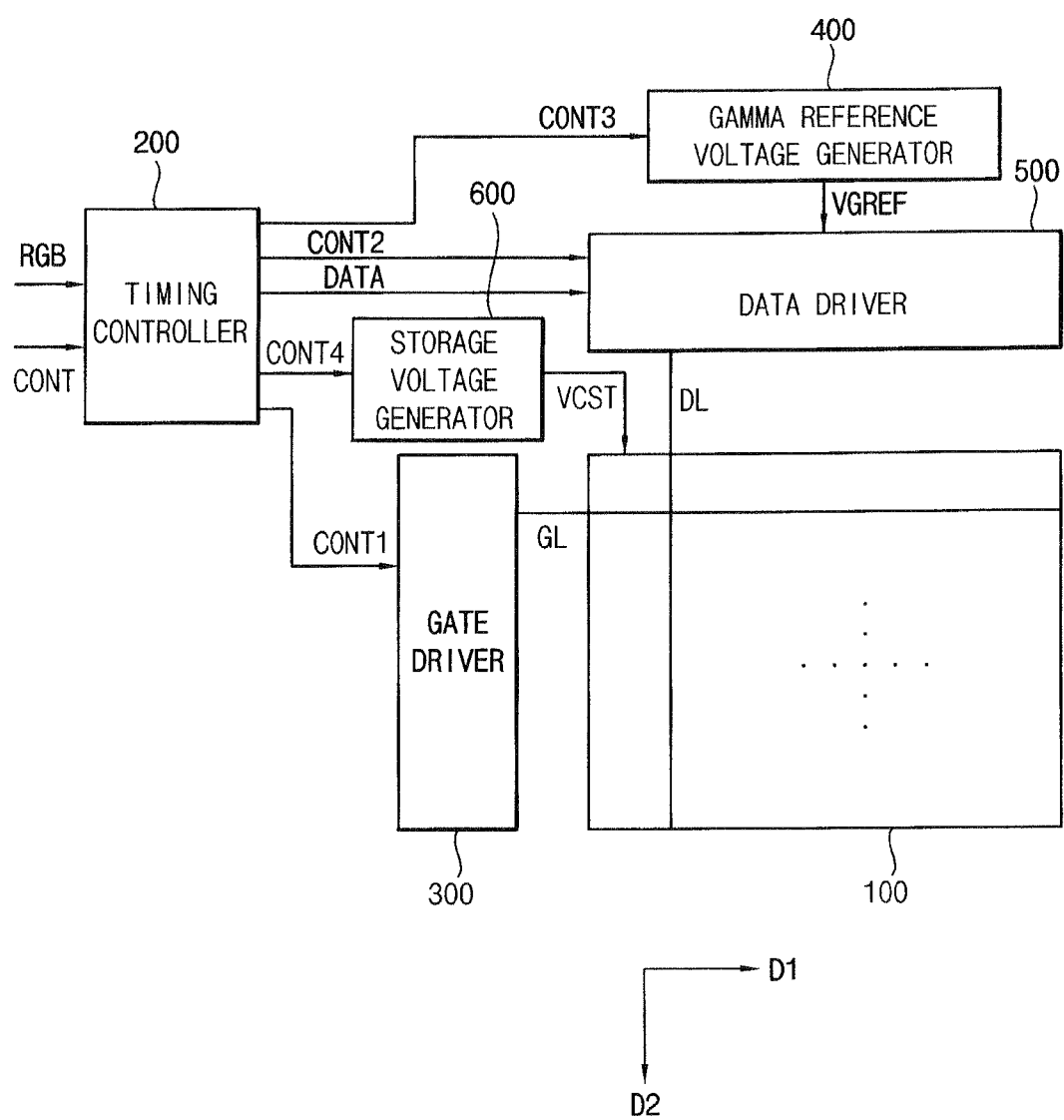
FIG. 9 is a block diagram illustrating a display apparatus according to an exemplary embodiment of the present invention.

FIG. 9 is a block diagram illustrating a display apparatus according to an exemplary embodiment of the present invention.

The display apparatus is the same or substantially the same as the display apparatus described in connection with FIGS. 1 to 3 except for a storage voltage generator 600 and the structure of the unit pixel.

Referring to FIG. 9, the display apparatus includes a display panel 100 and a panel driver. The panel driver includes a timing controller 200, a gate driver 300, a gamma reference voltage generator 400, a data driver 500 and a storage voltage generator 600.

The timing controller 200 generates a first control signal CONT1, a second control signal CONT2, a third control signal CONT3, a fourth control signal CONT4 and a data signal DATA based on input image data RGB and an input control signal CONT.

The timing controller 200 generates the fourth control signal CONT4 for controlling an operation of the storage voltage generator 600 based on the input control signal CONT and outputs the fourth control signal CONT4 to the storage voltage generator 600. The fourth control signal CONT4 includes a driving mode signal.

The storage voltage generator 600 generates storage voltages which vary according to the driving mode. The storage voltage generator 600 is described in detail referring to FIGS. 11 and 12.

Figure 10:
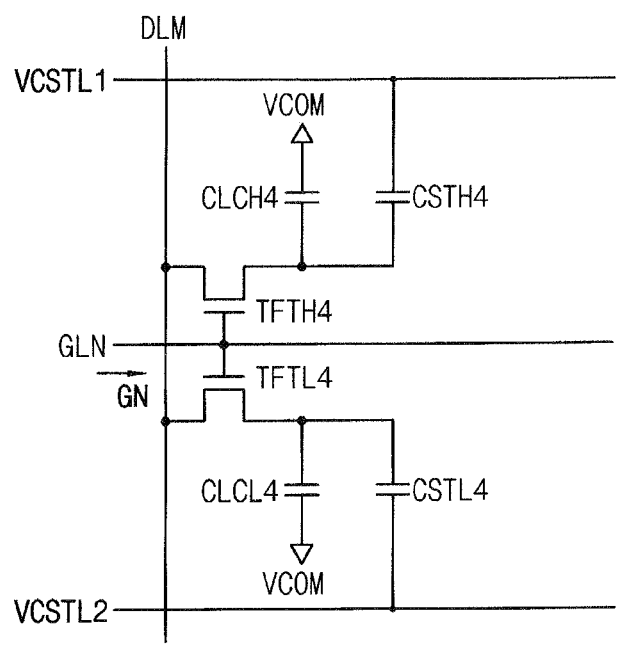
FIG. 10 is a circuit diagram illustrating a unit pixel included in the display apparatus of FIG. 9.

FIG. 10 is a circuit diagram illustrating a unit pixel included in the display apparatus of FIG. 9.

Referring to FIG. 10, the unit pixel includes a first subpixel and a second subpixel. The first subpixel is a high pixel. The second subpixel is a low pixel.

The first subpixel includes a first switching element TFTH4, a first liquid crystal capacitor CLCH4 and a first storage capacitor CSTH4. The second subpixel includes a second switching element TFTL4, a second liquid crystal capacitor CLCL4 and a second storage capacitor CSTL4.

The first switching element TFTH4 is connected to an N-th gate line GLN, an M-th data line DLM and a first pixel electrode. A gate electrode of the first switching element TFTH4 is connected to the N-th gate line GLN. A source electrode of the first switching element TFTH4 is connected to the M-th data line DLM. A drain electrode of the first switching element TFTH4 is connected to a first end of the first liquid crystal capacitor CLCH4 and a first end of the first storage capacitor CSTH4. The first pixel electrode is disposed at the first end of the first liquid crystal capacitor CLCH4. A common voltage VCOM is applied to a second end of the first liquid crystal capacitor CLCH4 opposite to the first end of the first liquid crystal capacitor CLCH4 through the common electrode. A second end of the first storage capacitor CSTH4 opposite to the first end of the first storage capacitor CSTH4 is connected to a first storage voltage line VCSTL1 and receives a first storage voltage VCST1.

The second switching element TFTL4 is connected to the N-th gate line GLN and the M-th data line DLM and a second pixel electrode. A gate electrode of the second switching element TFTL4 is connected to the N-th gate line GLN. A source electrode of the second switching element TFTL4 is connected to the M-th data line DLM. A drain electrode of the second switching element TFTL4 is connected to a first end of the second liquid crystal capacitor CLCL4 and a first end of the second storage capacitor CSTL4. The second pixel electrode is disposed at the first end of the second liquid crystal capacitor CLCL4. A common voltage VCOM is applied to a second end of the second liquid crystal capacitor CLCL4 opposite to the first end of the second liquid crystal capacitor CLCL4 through the common electrode. A second end of the second storage capacitor CSTL4 opposite to the first end of the second storage capacitor CSTL4 is connected to a second storage voltage line VCSTL2 and receives a second storage voltage VCST2.

Figure 11:
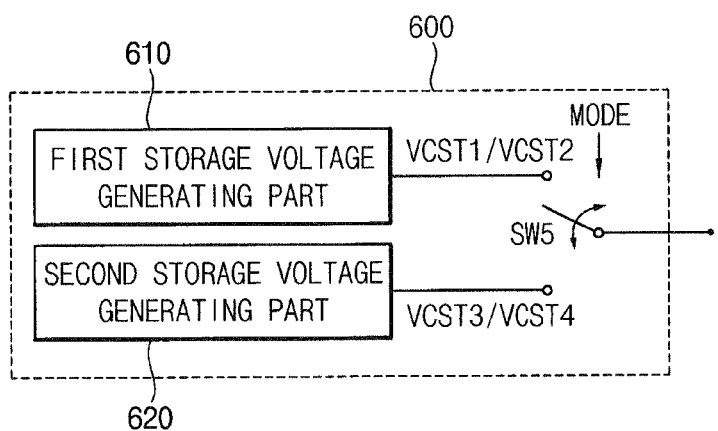
FIG. 11 is a block diagram illustrating a storage voltage generator of FIG. 9.
Figure 12:
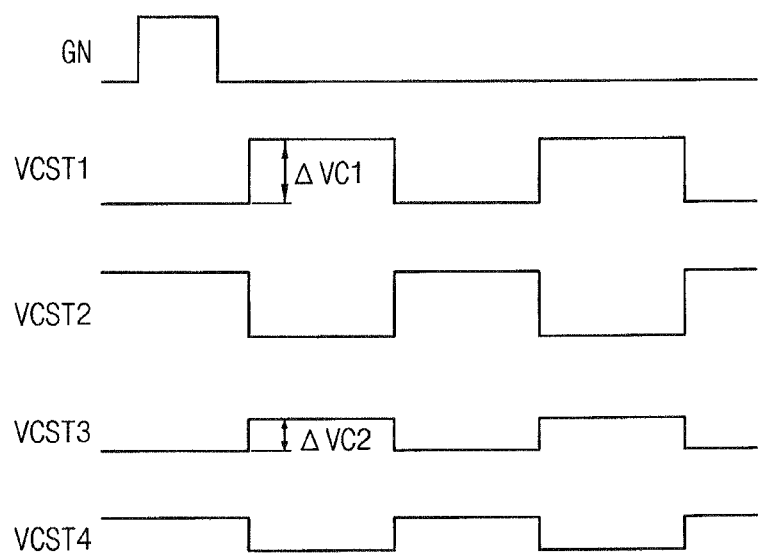
FIG. 12 is a waveform diagram illustrating signals applied to the unit pixel of FIG. 9.

FIG. 11 is a block diagram illustrating the storage voltage generator 600 of FIG. 9. FIG. 12 is a waveform diagram illustrating signals applied to the unit pixel of FIG. 9.

Referring to FIGS. 10 to 12, the storage voltage generator 600 includes a first storage voltage generating part 610, a second storage voltage generating part 620, and a fifth switch SW5.

The first storage voltage generating part 610 generates the first storage voltage VCST1 applied to the first storage voltage line VCSTL1 and the second storage voltage VCST2 applied to the second storage voltage line VCSTL2 in the 2D mode.

The first and second storage voltages VCST1 and VCST2 are alternating-current ("AC") voltages. The first and second storage voltages VCST1 and VCST2 periodically increase and decrease. For example, according to an embodiment, the first and second storage voltages VCST1 and VCST2 have square waves. For example, according to an embodiment, peak to peak amplitudes of the first and second storage voltages VCST1 and VCST2 are ΔVC1.

The first storage voltage VCST1 has a phase different from a phase of the second storage voltage VCST2. The first storage voltage VCST1 has a waveform opposite to the second storage voltage VCST2. For example, according to an embodiment, a rising edge of the first storage voltage VCST1 is the same or substantially the same as a falling edge of the second storage voltage VCST2. A falling edge of the first storage voltage VCST1 is the same or substantially the same as a rising edge of the second storage voltage VCST2.

The second storage voltage generating part 620 generates a third storage voltage VCST3 applied to the first storage voltage line VCSTL1 and a fourth storage voltage VCST4 applied to the second storage voltage line VCSTL2 in the 3D mode.

The third and fourth storage voltages VCST3 and VCST4 are AC voltages. The third and fourth storage voltages VCST3 and VCST4 periodically increase and decrease. For example, according to an embodiment, the third and fourth storage voltages VCST3 and VCST4 have square waves. For example, according to an embodiment, peak to peak amplitudes of the third and fourth storage voltages VCST3 and VCST4 are ΔVC2.

The third storage voltage VCST3 has a phase different from a phase of the fourth storage voltage VCST4. The third storage voltage VCST3 has a waveform opposite to the fourth storage voltage VCST4. For example, according to an embodiment, a rising edge of the third storage voltage VCST3 is the same or substantially the same as a falling edge of the fourth storage voltage VCST4. A falling edge of the third storage voltage VCST3 is the same or substantially the same as a rising edge of the fourth storage voltage VCST4.

An amplitude of the third storage voltage VCST3 in the 3D mode is smaller than an amplitude of the first storage voltage VCST1 in the 2D mode. For example, according to an embodiment, the amplitude of the third storage voltage VCST3 is close to 0.

The fifth switch SW5 is selectively connected to an output part of the first storage voltage generating part 610 and an output part of the second storage voltage generating part 620.

In the 2D mode, the fifth switch SW5 is connected to the output part of the first storage voltage generating part 610. When a gate on voltage of the N-th gate signal GN is applied to the N-th gate line GLN, the first and second switching elements TFTH4 and TFTL4 are turned on so that a first voltage is applied to the first subpixel and the second subpixel.

After a gate off voltage of the N-th gate signal GN is applied to the N-th gate line GLN, the first storage voltage VCST1 rises so that the first voltage charged to the first subpixel increases due to the first storage capacitor CSTH4. An increase of the first voltage is determined as following Equation 1.

$$\Delta V1 = \Delta VC1 \times \frac{CSTH}{CSTH + CLCH + Cgs} \quad \text{[Equation 1]}$$

Here, $\Delta V1$ is an increase of the first voltage V1, $\Delta VC1$ is the peak to peak amplitude of the first storage voltage VCST1, CSTH is a capacitance of the first storage capacitor CSTH4, CLCH is a capacitance of the first liquid crystal capacitor CLCH4, and Cgs is a parasitic capacitance between the gate electrode and the source electrode of the first switching element TFTH4.

After the gate off voltage of the N-th gate signal GN is applied to the N-th gate line GLN, the second storage voltage VCST2 falls so that the first voltage charged to the second subpixel decreases due to the second storage capacitor CSTL4. As a result, the voltage charged to the first subpixel is different from the voltage charged to the second subpixel for at least one grayscale.

In the 3D mode, the fifth switch SW5 is connected to the output part of the second storage voltage generating part 620. When the gate on voltage of the N-th gate signal GN is applied to the N-th gate line GLN, the first and second switching elements TFTH4 and TFTL4 are turned on so that a first voltage is applied to the first subpixel and the second subpixel.

After the gate off voltage of the N-th gate signal GN is applied to the N-th gate line GLN, the third storage voltage VCST3 rises so that the first voltage charged to the first subpixel increases due to the first storage capacitor CSTH4. However, the amplitude of the VCST3 is close to 0 so that the first voltage charged to the first subpixel does not change substantially.

After the gate off voltage of the N-th gate signal GN is applied to the N-th gate line GLN, the fourth storage voltage VCST4 falls so that the first voltage charged to the second subpixel decreases due to the second storage capacitor CSTL4. However, the amplitude of the VCST4 is close to 0 so that the first voltage charged to the second subpixel does not change substantially. As a result, the voltage charged to the first subpixel is the same or substantially the same as the voltage charged to the second subpixel.

Although it has been described in connection with FIGS. 10 to 12 that the storage voltage generator 600 includes the first storage voltage generating part 610 generating the storage voltages for the 2D mode and the second storage voltage generating part 620 generating the storage voltages for the 3D mode and the fifth switch SW5 operating according to the driving mode signal MODE, the embodiments of the present invention are not limited thereto. Alternatively, the storage voltage generator 600 includes a single block selectively generating the storage voltages for the 2D mode and the storage voltages for the 3D mode according to the driving mode signal MODE.

According to an exemplary embodiment, a data voltage charged to the first subpixel is different from a data voltage charged to the second subpixel in the 2D mode so that side visibility may be improved. The data voltage charged to the first subpixel is the same or substantially the same as the data voltage charged to the second subpixel in the 3D mode so that moiré may be prevented and the luminance of images may be improved. As a consequence, display quality may be improved when the display panel displays 2D images and 3D images.

Figure 13:
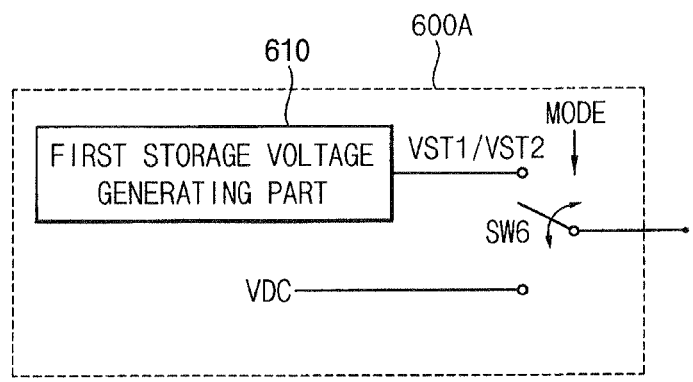
FIG. 13 is a storage voltage generator of a display apparatus according to an exemplary embodiment of the present invention.
Figure 14:
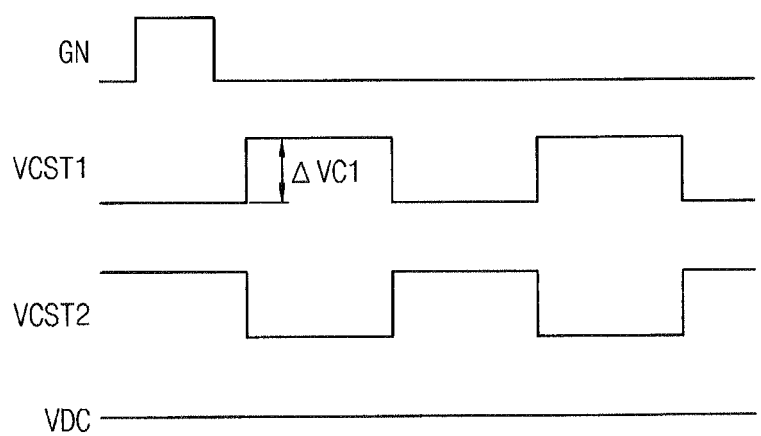
FIG. 14 is a waveform diagram illustrating signals applied to a unit pixel of the display apparatus of FIG. 13.

FIG. 13 is a storage voltage generator of a display apparatus according to an exemplary embodiment of the present invention. FIG. 14 is a waveform diagram illustrating signals applied to a unit pixel of the display apparatus of FIG. 13.

The display apparatus is the same or substantially the same as the display apparatus described in connection with FIGS. 9 to 12 except for the structure of the storage voltage generator 600A.

Referring to FIGS. 10, 13 and 14, the storage voltage generator 600A includes a first storage voltage generating part 610, a direct-current ("DC") storage voltage VDC applying line and a sixth switch SW6.

The first storage voltage generating part 610 generates the first storage voltage VCST1 applied to the first storage voltage line VCSTL1 and the second storage voltage VCST2 applied to the second storage voltage line VCSTL2 in the 2D mode.

The first and second storage voltages VCST1 and VCST2 are alternating-current ("AC") voltages. The first and second storage voltages VCST1 and VCST2 periodically increase and decrease. For example, according to an embodiment, peak to peak amplitudes of the first and second storage voltages VCST1 and VCST2 are $\Delta VC1$.

The first storage voltage VCST1 has a phase different from a phase of the second storage voltage VCST2. The first storage voltage VCST1 has a waveform opposite to the second storage voltage VCST2. For example, according to an embodiment, a rising edge of the first storage voltage VCST1 is the same or substantially the same as a falling edge of the second storage voltage VCST2. A falling edge of the first storage voltage VCST1 is the same or substantially the same as a rising edge of the second storage voltage VCST2.

The DC storage voltage applying line transmits the DC storage voltage VDC. For example, according to an embodiment, the DC storage voltage VDC is the same or substantially equal to the common voltage VCOM.

The sixth switch SW6 is selectively connected to an output part of the first storage voltage generating part 610 and the DC storage voltage applying line.

In the 2D mode, the sixth switch SW6 is connected to the output part of the first storage voltage generating part 610. When a gate on voltage of the N-th gate signal GN is applied to the N-th gate line GLN, the first and second switching elements TFTH4 and TFTL4 are turned on so that a first voltage is applied to the first subpixel and the second subpixel.

After a gate off voltage of the N-th gate signal GN is applied to the N-th gate line GLN, the first storage voltage VCST1 rises so that the first voltage charged to the first subpixel increases due to the first storage capacitor CSTH4.

After the gate off voltage of the N-th gate signal GN is applied to the N-th gate line GLN, the second storage voltage VCST2 falls so that the first voltage charged to the second subpixel decreases due to the second storage capacitor CSTL4 decreases. As a result, a voltage charged to the first subpixel is different from a voltage charged to the second subpixel for at least one grayscale.

In the 3D mode, the sixth switch SW6 is connected to the DC voltage applying line. When the gate on voltage of the N-th gate signal GN is applied to the N-th gate line GLN, the first and second switching elements TFTH4 and TFTL4 are turned on so that a first voltage is applied to the first subpixel and the second subpixel.

After the gate off voltage of the N-th gate signal GN is applied to the N-th gate line GLN, the DC storage voltage VDC does not change so that the first voltage charged to the first subpixel maintains a uniform or substantially a uniform level due to the first storage capacitor CSTH4.

After the gate off voltage of the N-th gate signal GN is applied to the N-th gate line GLN, the DC storage voltage VDC does not change so that the first voltage charged to the first subpixel maintains a uniform or a substantially uniform level due to the second storage capacitor CSTL4. As a result, a voltage charged to the first subpixel is the same or substantially the same as a voltage charged to the second subpixel.

According to an exemplary embodiment, a data voltage charged to the first subpixel is different from a data voltage charged to the second subpixel in the 2D mode so that side visibility may be improved. The data voltage charged to the first subpixel is the same or substantially the same as the data voltage charged to the second subpixel in the 3D mode so that moiré may be prevented and the luminance of images may be improved. As a consequence, display quality may be improved when the display panel displays 2D images and 3D images.

Figure 15:
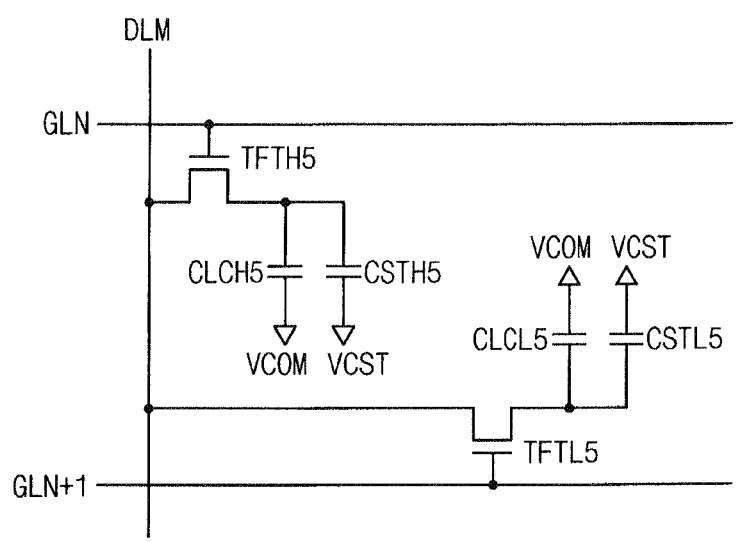
FIG. 15 is a circuit diagram illustrating a unit pixel of a display apparatus according to an exemplary embodiment of the present invention.

FIG. 15 is a circuit diagram illustrating a unit pixel of a display apparatus according to an exemplary embodiment of the present invention.

The display apparatus is the same or substantially the same as the display apparatus described in connection with FIGS. 1 to 3 except for the structure of the unit pixel.

Referring to FIG. 15, the unit pixel includes a first subpixel and a second subpixel. The first subpixel is a high pixel. The second subpixel is a low pixel.

In the 2D mode, a first voltage is charged to the first subpixel and a second voltage is charged to the second subpixel. The second voltage is different from the first voltage for at least one grayscale. For example, according to an embodiment, the first voltage is greater than the second voltage.

In the 3D mode, a third voltage is charged to the first subpixel and a fourth voltage is charged to the second subpixel. The fourth voltage is the same or substantially equal to the third voltage. For example, according to an embodiment, the third and fourth voltages may be the same or substantially equal to one of the first and second voltages.

The first subpixel includes a first switching element TFTH5, a first liquid crystal capacitor CLCH5 and a first storage capacitor CSTH5. The second subpixel includes a second switching element TFTL5, a second liquid crystal capacitor CLCL5 and a second storage capacitor CSTL5. The second subpixel is adjacent to the first subpixel in an extending direction of the gate line GL.

The display apparatus further includes a liquid crystal lens (not shown) disposed on the display panel 100. The liquid crystal lens transmits images from the display panel 100 without being refracted in the 2D mode. The liquid crystal lens refracts images from the display panel 100 and provides a first viewpoint image to a first viewpoint and a second viewpoint image to a second viewpoint in the 3D mode. For example, according to an embodiment, the liquid crystal lens transmits an image on the first subpixel to the first viewpoint and an image on the second subpixel to the second viewpoint.

Alternatively, the display apparatus further includes a liquid crystal barrier (not shown) disposed on the display panel 100. The liquid crystal barrier transmits images from the display panel 100 without being blocked in the 2D mode. The liquid crystal barrier selectively blocks images from the display panel 100 and provides a first viewpoint image to the first viewpoint and a second viewpoint image to the second viewpoint in the 3D mode. For example, according to an embodiment, the liquid crystal barrier transmits an image on the first subpixel to the first viewpoint and an image on the second subpixel to the second viewpoint.

The first switching element TFTH5 is connected to an N-th gate line GLN and an M-th data line DLM. A gate electrode of the first switching element TFTH5 is connected to the N-th gate line GLN. A source electrode of the first switching element TFTH5 is connected to the M-th data line DLM. A drain electrode of the first switching element TFTH5 is connected to a first end of the first liquid crystal capacitor CLCH5 and a first end of the first storage capacitor CSTH5. A first pixel electrode is disposed at the first end of the first liquid crystal capacitor CLCH5. A common voltage VCOM is applied to a second end of the first liquid crystal capacitor CLCH5 opposite to the first end of the first liquid crystal capacitor CLCH5 through the common electrode. A storage voltage VCST is applied to a second end of the first storage capacitor CSTH5 opposite to the first end of the first storage capacitor CSTH5. For example, according to an embodiment, the common voltage VCOM is the same or substantially equal to the storage voltage VCST.

The second switching element TFTL5 is connected to an (N+1)-th gate line GLN+1 adjacent to the N-th gate line GLN and the M-th data line DLM. A gate electrode of the second switching element TFTL5 is connected to the (N+1)-th gate line GLN+1. A source electrode of the second switching element TFTL5 is connected to the M-th data line DLM. A drain electrode of the second switching element TFTL5 is connected to a first end of the second liquid crystal capacitor CLCL5 and a first end of the second storage capacitor CSTL5. A second pixel electrode is disposed at the first end of the second liquid crystal capacitor CLCL5. A common voltage VCOM is applied to a second end of the second liquid crystal capacitor CLCL5 opposite to the first end of the second liquid crystal capacitor CLCL5 through the common electrode. A storage voltage VCST is applied to a second end of the second storage capacitor CSTL5 opposite to the first end of the second storage capacitor CSTL5. In an exemplary embodiment, at least one of the first and second storage capacitors CSTH5 and CSTL5 is omitted.

The lookup tables of FIGS. 3 and 4 are employed in the display apparatus described in connection with FIG. 15.

According to an exemplary embodiment, a data voltage charged to the first subpixel is different from a data voltage charged to the second subpixel in the 2D mode so that side visibility may be improved. The data voltage charged to the first subpixel is the same or substantially the same as the data voltage charged to the second subpixel in the 3D mode so that moiré may be prevented and the luminance of images may be improved.

An image on the first subpixel is transmitted to the first viewpoint and an image on the second subpixel is transmitted to the second viewpoint in the 3D mode so that the resolution of 3D images may be prevented from decreasing. As a consequence, display quality may be improved when the display panel displays 2D images and 3D images.

Figure 16:
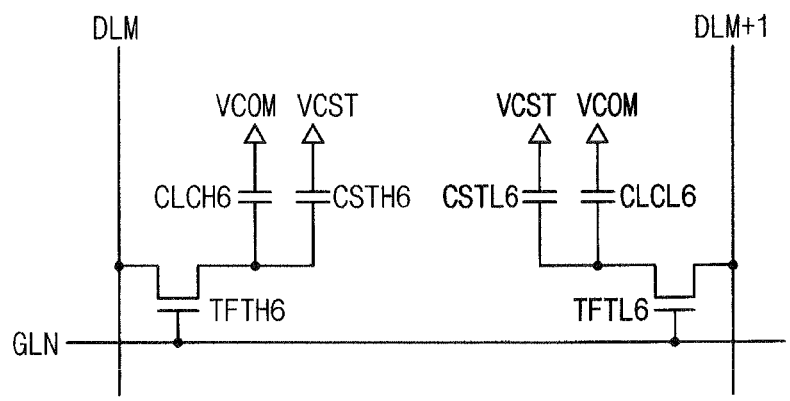
FIG. 16 is a circuit diagram illustrating a unit pixel of a display apparatus according to an exemplary embodiment of the present invention.

FIG. 16 is a circuit diagram illustrating a unit pixel of a display apparatus according to an exemplary embodiment of the present invention.

The display apparatus is the same or substantially the same as the display apparatus described in connection with FIGS. 1 to 3 except for the structure of the unit pixel.

Referring to FIG. 16, the unit pixel includes a first subpixel and a second subpixel. The first subpixel is a high pixel. The second subpixel is a low pixel.

In the 2D mode, a first voltage is charged to the first subpixel and a second voltage is charged to the second subpixel. The second voltage is different from the first voltage for at least one grayscale. For example, according to an embodiment, the first voltage is greater than the second voltage.

In the 3D mode, a third voltage is charged to the first subpixel and a fourth voltage is charged to the second subpixel. The fourth voltage is the same or substantially equal to the third voltage. For example, according to an embodiment, the third and fourth voltages are the same or substantially equal to one of the first and second voltages.

The first subpixel includes a first switching element TFTH6, a first liquid crystal capacitor CLCH6 and a first storage capacitor CSTH6. The second subpixel includes a second switching element TFTL6, a second liquid crystal capacitor CLCL6 and a second storage capacitor CSTL6. The second subpixel is adjacent to the first subpixel in an extending direction of the data line DL.

The display apparatus further includes a liquid crystal lens (not shown) disposed on the display panel 100. The liquid crystal lens transmits images from the display panel 100 without being refracted in the 2D mode. The liquid crystal lens refracts images from the display panel 100 and provides a first viewpoint image to a first viewpoint and a second viewpoint image to a second viewpoint in the 3D mode. For example, according to an embodiment, the liquid crystal lens transmits an image on the first subpixel to the first viewpoint and an image on the second subpixel to the second viewpoint.

Alternatively, the display apparatus further includes a liquid crystal barrier (not shown) disposed on the display panel 100. The liquid crystal barrier transmits images from the display panel 100 without being blocked in the 2D mode. The liquid crystal barrier selectively blocks images from the display panel 100 and provides a first viewpoint image to the first viewpoint and a second viewpoint image to the second viewpoint in the 3D mode. For example, according to an embodiment, the liquid crystal barrier transmits an image on the first subpixel to the first viewpoint and an image on the second subpixel to the second viewpoint.

The first switching element TFTH6 is connected to an N-th gate line GLN and an M-th data line DLM. A gate electrode of the first switching element TFTH6 is connected to the N-th gate line GLN. A source electrode of the first switching element TFTH6 is connected to the M-th data line DLM. A drain electrode of the first switching element TFTH6 is connected to a first end of the first liquid crystal capacitor CLCH6 and a first end of the first storage capacitor CSTH6. A first pixel electrode is disposed at the first end of the first liquid crystal capacitor CLCH6. A common voltage VCOM is applied to a second end of the first liquid crystal capacitor CLCH6 opposite to the first end of the first liquid crystal capacitor CLCH6 through the common electrode. A storage voltage VCST is applied to a second end of the first storage capacitor CSTH6 opposite to the first end of the first storage capacitor CSTH6. For example, according to an embodiment, the common voltage VCOM is the same or substantially equal to the storage voltage VCST.

The second switching element TFTL6 is connected to the N-th gate line GLN and an (M+1)-th data line DLM+1 adjacent to the M-th data line DLM. A gate electrode of the second switching element TFTL6 is connected to the N-th gate line GLN. A source electrode of the second switching element TFTL6 is connected to the (M+1)-th data line DLM+1. A drain electrode of the second switching element TFTL6 is connected to a first end of the second liquid crystal capacitor CLCL6 and a first end of the second storage capacitor CSTL6. A second pixel electrode is disposed at the first end of the second liquid crystal capacitor CLCL6. A common voltage VCOM is applied to a second end of the second liquid crystal capacitor CLCL6 opposite to the first end of the second liquid crystal capacitor CLCL6 through the common electrode. A storage voltage VCST is applied to a second end of the second storage capacitor CSTL6 opposite to the first end of the second storage capacitor CSTL6. In an exemplary embodiment, at least one of the first and second storage capacitors CSTH6 and CSTL6 is omitted.

The lookup tables of FIGS. 3 and 4 are applied to the display apparatus described in connection with FIG. 16.

According to an exemplary embodiment, a data voltage charged to the first subpixel is different from a data voltage charged to the second subpixel in the 2D mode so that side visibility may be improved. The data voltage charged to the first subpixel is the same or substantially the same as the data voltage charged to the second subpixel in the 3D mode so that moiré may be prevented and the luminance of images may be improved.

An image on the first subpixel is transmitted to the first viewpoint and an image on the second subpixel is transmitted to the second viewpoint in the 3D mode so that the resolution of 3D images may be prevented from decreasing. As a consequence, display quality may be improved when the display panel displays 2D images and 3D images.

According to the embodiments of the present invention, side visibility may be improved when the display panel displays a 2D image, and a moiré phenomenon may be prevented and the luminance of images may be improved when the display panel displays a 3D image.

As a consequence, display quality may be improved when the display panel displays 2D images and 3D images.

The foregoing is illustrative of the embodiments of the present invention and is not to be construed as limiting thereof. Although a few example embodiments of the present invention have been described, those skilled in the art will readily appreciate that many modifications are possible in the example embodiments. Accordingly, all such modifications are intended to be included within the scope of the embodiments of the present invention as defined in the claims.

What is claimed is:

1. A method of driving a display panel, the method comprising:
   determining a driving mode including a two-dimensional ("2D") mode and a three-dimensional ("3D") mode; and
   charging a voltage which varies according to the driving mode to at least one subpixel in a unit pixel of the display panel.

2. The method of claim 1, wherein the unit pixel includes a first subpixel and a second subpixel, and wherein
a first voltage is charged to the first subpixel and a second voltage is charged to the second subpixel in the 2D mode, wherein the second voltage is different from the first voltage for at least one grayscale.

3. The method of claim 2, wherein a third voltage is charged to the first subpixel and a fourth voltage is charged to the second subpixel in the 3D mode, wherein the fourth voltage is the same or substantially equal to the third voltage.

4. The method of claim 3, wherein the third and fourth voltages are the same or substantially equal to one of the first voltage and the second voltage.

5. The method of claim 1, further comprising generating a gamma reference voltage which varies according to the driving mode.

6. The method of claim 1, wherein the unit pixel comprises:
a first switching element connected to an N-th gate line and an M-th data line; and
a second switching element connected to an (N+1)-th gate line adjacent to the N-th gate line and the M-th data line, wherein N and M are natural numbers.

7. The method of claim 6, wherein the unit pixel comprises a first subpixel including the first switching element and a first pixel electrode connected to the first switching element and a second subpixel including the second switching element and a second pixel electrode connected to the second switching element, wherein
the second subpixel is adjacent to the first subpixel in an extending direction of the M-th data line.

8. The method of claim 6, wherein the unit pixel comprises a first subpixel including the first switching element and a first pixel electrode connected to the first switching element and a second subpixel including the second switching element and a second pixel electrode connected to the second switching element, wherein
the second subpixel is adjacent to the first subpixel in an extending direction of the N-th gate line.

9. The method of claim 1, wherein the unit pixel comprises:
a first switching element connected to an N-th gate line and an M-th data line; and
a second switching element connected to the N-th gate line and an (M+1)-th data line adjacent to the M-th data line, wherein N and M are natural numbers.

10. The method of claim 9, wherein the unit pixel comprises a first subpixel including the first switching element and a first pixel electrode connected to the first switching element and a second subpixel including the second switching element and a second pixel electrode connected to the second switching element, wherein
the second subpixel is adjacent to the first subpixel in an extending direction of the M-th data line.

11. The method of claim 9, wherein the unit pixel comprises a first subpixel including the first switching element and a first pixel electrode connected to the first switching element and a second subpixel including the second switching element and a second pixel electrode connected to the second switching element, wherein
the second subpixel is adjacent to the first subpixel in an extending direction of the N-th gate line.

12. The method of claim 1, wherein the unit pixel comprises:
a first subpixel including a first switching element connected to an N-th gate line and an M-th data line, and a first pixel electrode connected to the first switching element;
a second subpixel including a second switching element connected to the N-th gate line and the M-th data line, and a second pixel electrode connected to the second switching element; and
a third switching element including a gate electrode connected to an N-th control line, a source electrode connected to a second end of a capacitor, wherein a storage voltage is applied to a first end of the capacitor, and a drain electrode connected to the second pixel electrode, wherein N and M are natural numbers.

13. The method of claim 12, wherein a voltage that varies according to the driving mode is applied to the gate electrode of the third switching element.

14. The method of claim 13, wherein an N-th control signal is applied to the gate electrode of the third switching element in the 2D mode, wherein
the N-th control signal has a gate on voltage after a gate on voltage of an N-th gate signal is applied to the N-th gate line, and wherein
a gate off voltage is applied to the gate electrode of the third switching element in the 3D mode.

15. The method of claim 14, wherein the N-th control line is connected to an (N+K)-th gate line in the 2D mode, and wherein
the N-th control signal is an (N+K)-th gate signal applied to the (N+K)-th gate line, wherein K is a natural number.

16. The method of claim 1, wherein the unit pixel comprises a first subpixel and a second subpixel, wherein
the first subpixel includes:
a first switching element connected to an N-th gate line, an M-th data line and a first pixel electrode;
a first liquid crystal capacitor connected to the first pixel electrode and a common electrode; and
a first storage capacitor connected to the first pixel electrode and a first storage voltage line, and wherein
the second subpixel includes:
a second switching element connected to the N-th gate line, the M-th data line and a second pixel electrode;
a second liquid crystal capacitor connected to the second pixel electrode and the common electrode; and
a second storage capacitor connected to the second pixel electrode and a second storage voltage line, wherein N and M are natural numbers.

17. The method of claim 16, further comprising generating storage voltages which vary according to the driving mode.

18. The method of claim 17, wherein a first storage voltage is applied to the first storage voltage line and a second storage voltage is applied to the second storage voltage line in the 2D mode, and wherein
each of the first storage voltage and the second storage voltage periodically increases and decreases, wherein the first storage voltage has a phase different from a phase of the second storage voltage.

19. The method of claim 18, wherein a third storage voltage is applied to the first storage voltage line and a fourth storage voltage is applied to the second storage voltage line in the 3D mode, and wherein
an amplitude of the third storage voltage is smaller than an amplitude of the first storage voltage.

20. The method of claim 18, wherein a third storage voltage is applied to the first storage voltage line and a fourth storage voltage is applied to the second storage voltage line in the 3D mode, and wherein
the third and fourth storage voltages are direct-current ("DC") voltages.

21. A display apparatus comprising:
a display panel including a unit pixel having a plurality of subpixels; and
a panel driver configured to charge a voltage which varies according to a driving mode to at least one of the subpixels, wherein the driving mode includes a two-dimensional ("2D") mode and a three-dimensional ("3D") mode.

22. The display apparatus of claim 21, wherein the unit pixel includes a first subpixel and a second subpixel, and wherein
the panel driver is configured to charge a first voltage to the first subpixel and a second voltage to the second subpixel in the 2D mode, wherein the second voltage is different from the first voltage for at least one grayscale.

23. The display apparatus of claim 22, wherein the panel driver is configured to charge a third voltage to the first subpixel and a fourth voltage to the second subpixel in the 3D mode, wherein the fourth voltage is the same or substantially equal to the third voltage.

24. The display apparatus of claim 23, wherein the third and fourth voltages are the same or substantially equal to one of the first voltage and the second voltage.

25. The display apparatus of claim 21, wherein the panel driver comprises a gamma reference voltage generator configured to generate a gamma reference voltage which varies according to the driving mode.

26. The display apparatus of claim 25, wherein the unit pixel comprises:
a first switching element connected to an N-th gate line and an M-th data line; and
a second switching element connected to the N-th gate line and an (M+1)-th data line adjacent to the M-th data line, wherein N and M are natural numbers.

27. The display apparatus of claim 26, wherein the unit pixel comprises a first subpixel including the first switching element and a first pixel electrode connected to the first switching element and a second subpixel including the second switching element and a second pixel electrode connected to the second switching element, and wherein
the second subpixel is adjacent to the first subpixel in an extending direction of the N-th gate line.

28. The display apparatus of claim 26, wherein the unit pixel comprises a first subpixel including the first switching element and a first pixel electrode connected to the first switching element and a second subpixel including the second switching element and a second pixel electrode connected to the second switching element, and wherein
the second subpixel is adjacent to the first subpixel in an extending direction of the N-th gate line.

29. The display apparatus of claim 28, further comprising a liquid crystal lens on the display panel, wherein the liquid crystal lens is configured to transmit an image from the display panel without being refracted in the 2D mode and is configured to refract the image from the display panel in the 3D mode, and wherein
the liquid crystal lens is configured to provide an image on the first subpixel to a first viewpoint and an image on the second subpixel to a second viewpoint in the 3D mode.

30. The display apparatus of claim 28, further comprising a liquid crystal barrier on the display panel, wherein the liquid crystal barrier is configured to transmit an image from the display panel without being blocked in the 2D mode and is configured to selectively block the image from the display panel in the 3D mode, and wherein
the liquid crystal barrier is configured to provide an image on the first subpixel to a first viewpoint and an image on the second subpixel to a second viewpoint in the 3D mode.

31. The display apparatus of claim 21, wherein the unit pixel comprises:
a first switching element connected to an N-th gate line and an M-th data line; and
a second switching element connected to an (N+1)-th gate line adjacent to the N-th gate line and the M-th data line, wherein N and M are natural numbers.

32. The display apparatus of claim 31, wherein the unit pixel comprises a first subpixel including the first switching element and a first pixel electrode connected to the first switching element and a second subpixel including the second switching element and a second pixel electrode connected to the second switching element, and wherein
the second subpixel is adjacent to the first subpixel in an extending direction of the M-th data line.

33. The display apparatus of claim 31, wherein the unit pixel comprises a first subpixel including the first switching element and a first pixel electrode connected to the first switching element and a second subpixel including the second switching element and a second pixel electrode connected to the second switching element, and wherein
the second subpixel is adjacent to the first subpixel in an extending direction of the N-th gate line.

34. The display apparatus of claim 33, further comprising a liquid crystal lens on the display panel, wherein the liquid crystal lens is configured to transmit an image from the display panel without being refracted in the 2D mode and is configured to refract the image from the display panel in the 3D mode, and wherein
the liquid crystal lens is configured to provide an image on the first subpixel to a first viewpoint and an image on the second subpixel to a second viewpoint in the 3D mode.

35. The display apparatus of claim 33, further comprising a liquid crystal barrier on the display panel, wherein the liquid crystal barrier is configured to transmit an image from the display panel without being blocked in the 2D mode and is configured to selectively block the image from the display panel in the 3D mode, and wherein
the liquid crystal barrier is configured to provide an image on the first subpixel to a first viewpoint and an image on the second subpixel to a second viewpoint in the 3D mode.

36. The display apparatus of claim 21, wherein the unit pixel comprises:
a first subpixel including a first switching element connected to an N-th gate line and an M-th data line, and a first pixel electrode connected to the first switching element;
a second subpixel including a second switching element connected to the N-th gate line and the M-th data line, and a second pixel electrode connected to the second switching element; and
a third switching element including a gate electrode connected to an N-th control line, a source electrode connected to a second end of a capacitor, wherein a storage voltage is applied to a first end of the capacitor, and a drain electrode connected to the second pixel electrode, wherein N and M are natural numbers.

37. The display apparatus of claim 36, wherein a voltage that varies according to the driving mode is applied to the gate electrode of the third switching element.

38. The display apparatus of claim 37, wherein an N-th control signal is applied to the gate electrode of the third switching element in the 2D mode, wherein
- the N-th control signal has a gate on voltage after a gate on voltage of an N-th gate signal is applied to the N-th gate line, and wherein
- a gate off voltage is applied to the gate electrode of the third switching element in the 3D mode.

39. The display apparatus of claim 38, wherein the N-th control line is connected to an (N+K)-th gate line in the 2D mode, and wherein
- the N-th control signal is an (N+K)-th gate signal applied to the (N+K)-th gate line, wherein K is a natural number.

40. The display apparatus of claim 21, wherein the unit pixel comprises a first subpixel and a second subpixel, wherein
- the first subpixel includes:
  - a first switching element connected to an N-th gate line, an M-th data line and a first pixel electrode;
  - a first liquid crystal capacitor connected to the first pixel electrode and a common electrode; and
  - a first storage capacitor connected to the first pixel electrode and a first storage voltage line, and
- the second subpixel includes:
  - a second switching element connected to the N-th gate line, the M-th data line and a second pixel electrode;
  - a second liquid crystal capacitor connected to the second pixel electrode and the common electrode; and
  - a second storage capacitor connected to the second pixel electrode and a second storage voltage line, wherein N and M are natural numbers.

41. The display apparatus of claim 40, wherein the panel driver includes a storage voltage generator configured to generate storage voltages which vary according to the driving mode.

42. The display apparatus of claim 41, wherein the storage voltage generator is configured to apply a first storage voltage to the first storage voltage line and a second storage voltage to the second storage voltage line in the 2D mode, and wherein
- each of the first storage voltage and the second storage voltage periodically increases and decreases, wherein the first storage voltage has a phase different from a phase of the second storage voltage.

43. The display apparatus of claim 42, wherein the storage voltage generator is configured to apply a third storage voltage to the first storage voltage line and a fourth storage voltage to the second storage voltage line in the 3D mode, and wherein
- an amplitude of the third storage voltage is smaller than an amplitude of the first storage voltage.

44. The display apparatus of claim 42, wherein the storage voltage generator is configured to apply a third storage voltage to the first storage voltage line and a fourth storage voltage to the second storage voltage line in the 3D mode, and wherein
- the third and fourth storage voltages are direct-current ("DC") voltages.

45. The display apparatus of claim 21, further comprising a liquid crystal lens on the display panel, wherein the liquid crystal lens is configured to transmit an image from the display panel without being refracted in the 2D mode and is configured to refract the image from the display panel in the 3D mode.

46. The display apparatus of claim 21, further comprising a liquid crystal barrier on the display panel, wherein the liquid crystal barrier is configured to transmit an image from the display panel without being blocked in the 2D mode and is configured to selectively block the image from the display panel in the 3D mode.

47. The display apparatus of claim 21, wherein the panel driver is configured to temporally divide image data and to apply the divided image data to the display panel in the 3D mode.

48. The display apparatus of claim 21, wherein the unit pixel comprises a first unit pixel and a second unit pixel, wherein the first unit pixel corresponds to a viewpoint different from a viewpoint of the second unit pixel, and wherein
- the display apparatus further comprises a polarizing element on the display panel, wherein the polarizing element is configured to polarize light transmitted through the first unit pixel and light transmitted through the second unit pixel in different directions from each other in the 3D mode.

49. A display panel comprising a pixel that includes first and second subpixels, wherein the first and second subpixels are configured to be charged with different voltages, respectively, in a two dimensional driving mode and wherein both of the first and second subpixels are configured to be charged with one of the different voltages in a three dimensional driving mode.

* * * * *